US012763967B1

(12) United States Patent
Kaliski, Jr. et al.

(10) Patent No.: US 12,763,967 B1
(45) Date of Patent: Oct. 13, 2026

(54) METHODS AND SYSTEMS FOR FLATTENED ELECTRONIC SIGNATURES

(71) Applicant: VeriSign, Inc., Reston, VA (US)

(72) Inventors: Burton S. Kaliski, Jr., McLean, VA (US); Andrew Fregly, Reston, VA (US); Joseph Harvey, Clifton, VA (US)

(73) Assignee: VeriSign, Inc., Reston, VA (US)

( * ) Notice: Subject to any disclaimer, the term of this patent is extended or adjusted under 35 U.S.C. 154(b) by 787 days.

(21) Appl. No.: 17/900,457

(22) Filed: Aug. 31, 2022

Related U.S. Application Data

(60) Provisional application No. 63/239,130, filed on Aug. 31, 2021.

(51) Int. Cl.
*H04L 9/32* (2006.01)
*H04L 9/30* (2006.01)

(52) U.S. Cl.
CPC .............. *H04L 9/3247* (2013.01); *H04L 9/30* (2013.01)

(58) Field of Classification Search
CPC ....... H04L 9/0825; H04L 9/3297; H04L 9/50; H04L 9/3263; H04L 63/08; H04L 63/12; H04L 9/006; H04L 9/3247; H04L 61/4511; H04L 63/06; H04L 9/3239; H04L 63/123; H04L 9/3265; H04L 9/007; G06Q 50/26; G06Q 50/184; G06Q 10/10; G06Q 30/018
See application file for complete search history.

(56) References Cited

U.S. PATENT DOCUMENTS 7,730,518 B2 6/2010 Jakobsson et al.
8,645,701 B2 * 2/2014 Gould .................... H04L 63/08 380/282
10,116,450 B1 * 10/2018 Brown .................. H04L 9/3239
(Continued)

FOREIGN PATENT DOCUMENTS

CN 114598455 A * 6/2022 ........... H04L 9/0825

OTHER PUBLICATIONS

U.S. Appl. No. 63/194,835, filed May 28, 2021.
(Continued)

*Primary Examiner* — Joseph G Ustaris
(74) *Attorney, Agent, or Firm* — McCarter & English, LLP; Michael A. Sartori

(57) ABSTRACT

Systems, methods, and computer products for flattening electronic signatures, such as the signatures used for DNS zone signing keys. Associated operation may include: obtaining a first electronic signature on a mid-level public key and information associated therewith, wherein the first electronic signature is validatable by a high-level public key; obtaining a low-level public key and information associated therewith; generating a second electronic signature on the low-level public key and the information associated therewith, wherein the second electronic signature is validatable by the mid-level public key; and constructing a third electronic signature comprising the mid-level public key, the information associated therewith, the first electronic signature and the second electronic signature, wherein the third electronic signature is validatable by the high-level public key. Also included are systems, methods, and computer products and media for validating an electronic signature, such as a flattened electronic signature.

21 Claims, 10 Drawing Sheets

(56) References Cited

U.S. PATENT DOCUMENTS

| | | | | |
|---|---|---|---|---|
| 10,153,905 | B2 | 12/2018 | Kaliski, Jr. | |
| 11,025,407 | B2 | 6/2021 | Kaliski, Jr. | |
| 11,588,645 | B1 * | 2/2023 | Yavuz | H04L 9/14 |
| 2005/0091485 | A1 * | 4/2005 | Imai | H04L 63/0876 713/156 |
| 2005/0097314 | A1 * | 5/2005 | Matsushima | G06F 21/33 713/156 |
| 2012/0017090 | A1 * | 1/2012 | Gould | H04L 63/08 713/176 |
| 2015/0312759 | A1 * | 10/2015 | Kim | G06F 21/10 455/411 |
| 2017/0142049 | A1 * | 5/2017 | Ganin | H04L 67/10 |
| 2017/0163425 | A1 * | 6/2017 | Kaliski, Jr. | H04L 63/123 |
| 2017/0272250 | A1 * | 9/2017 | Kaliski, Jr. | H04L 9/3239 |
| 2017/0317836 | A1 * | 11/2017 | Wei | H04L 63/0281 |
| 2018/0076957 | A1 * | 3/2018 | Watanabe | G06F 21/602 |
| 2020/0304316 | A1 * | 9/2020 | Zaverucha | H04L 9/3252 |
| 2020/0320527 | A1 * | 10/2020 | Zhuang | G06Q 20/389 |
| 2021/0377049 | A1 * | 12/2021 | Nix | H04L 9/0877 |
| 2022/0027357 | A1 * | 1/2022 | Unagami | H04L 9/3239 |
| 2022/0038291 | A1 * | 2/2022 | Hong | H04L 9/3231 |
| 2022/0166633 | A1 * | 5/2022 | Whittaker | G06F 21/1087 |
| 2023/0042284 | A1 * | 2/2023 | Park | G06Q 20/3223 |
| 2023/0169216 | A1 * | 6/2023 | Zeng | G06F 21/575 713/176 |
| 2023/0361994 | A1 * | 11/2023 | Nix | H04L 9/0618 |
| 2024/0056314 | A1 * | 2/2024 | Yamamuro | H04L 9/3297 |

OTHER PUBLICATIONS

U.S. Appl. No. 17/827,576, filed May 27, 2022.

Burt Kaliski, "Shoring up the Infrastructure: A Strategy for Standardizing Hash Signatures," Dec. 14, 2014, 3 pages.

A. Huelsing, et al., "XMSS: eXtended Merkle Signature Scheme," RFC 8391, May 2018, 74 pages.

R. Arends, et al., "Protocol Modifications for the DNS Security Extensions," RFC 4035, Mar. 2005, 53 pages.

D. McGrew, et al., "Leighton-Micali Hash-Based Signatures," RFC 8554, Apr. 2019, 61 pages.

* cited by examiner

DNSSEC Data With Multiple KSK and ZSK Algorithm Types Including Hash-Based Algorithms for KSKs and ZSKs DNSSEC Data With Multiple KSK and ZSK Algorithm Types Including Hash-Based KSKs and Synthesized ZSKs Synthesized KSK For Keys in DNSKEY RRset With Flattened Signature Incorporating Signature of Hash-Based Mid-Level Key

METHODS AND SYSTEMS FOR FLATTENED ELECTRONIC SIGNATURES

CROSS REFERENCE TO RELATED APPLICATION

This application claims the benefit of U.S. Provisional Patent Application No. 63/239,130 filed Aug. 31, 2021, which is incorporated herein by reference.

FIELD

This disclosure relates generally to electronic or digital signatures, that provide integrity, authenticity, and/or trust for digital objects, and, more particularly, to electronic or digital signing techniques that are quantum resistant, and which may maintain compatibility with existing electronic-signing environments, such as the Domain Name System (DNS), among others.

BACKGROUND

A hash or fingerprint, such as a cryptographic hash, is typically a function that can input any of a variety of computer-interpretable objects and output a fixed-size derivation. Cryptographic hashes typically have other useful properties such as preimage resistance (or irreversibility) and collision resistance.

Asymmetric cryptography refers, for example, to traditional cryptography that typically utilizes a key pair, such as a public key and a private key. A message may be encrypted by applying an encryption algorithm under control of the public key to a message, and an encrypted message may be decrypted by applying a conjugate decryption algorithm and under control of the private key to the encrypted message. Asymmetric cryptography includes, for example, well-known algorithms such as the Rivest-Shamir-Adleman (RSA) technique, and the Diffie-Hellman family of techniques. Notably, the security of asymmetric cryptography typically relies on the difficulty of solving certain algebraic problems using standard computers.

A digital signature or electronic signature is typically the result of applying the private key of an asymmetric cryptographic key pair to a digital object. The corresponding public key is published or otherwise made available by the signing entity to the verifying party. The object may first be hashed as part of the signature process. A verifying party can verify the signature by applying the public key to the signature and comparing the result to the object or the hash of the object, or otherwise by determining that the signature corresponds to the object or its hash, depending on the scheme. If the comparison results in a match, then the signature is valid; if the comparison does not result in a match, then the signature is invalid. A digital signature typically confers certain properties, such as authentication (e.g., binding the signed object to the signer), non-repudiation (e.g., assuring that the signed object was indeed signed by the signing entity), and object integrity (e.g., assuring that the signed object has not changed since being signed). Validating a signature, for example, confirms that one or more of the aforementioned properties holds true for the signed object. A key pair, such as a public/private key pair, that supports a digital signature may or may not also support encryption and decryption operations.

A naming system for resources, such as a distributed naming system, may associate names to resource addresses for resources provided by computer servers connected to a network, and allow computers and humans to access the networked resources using the names. For example, the Domain Name System (DNS) is a hierarchical distributed naming system for resources, such as resources provided by computer servers connected to the internet. The DNS associates domain names to Internet Protocol (IP) addresses, and allows computers and humans to access networked resources using domain names.

Naming systems may be organized into zones, such as DNS zones which are the basic unit of organization of authoritative name data for the DNS. The DNS, for example, relies on extensive delegation of such authority. In this respect, the term child may refer to an entity of record to which a parent entity may delegate name resolution authority for a domain, or portion thereof. As known to one of ordinary skill in the art, the terms parent and child may also be identified with the respective zones.

SUMMARY

Various embodiments include systems, methods, and computer products and media for flattening electronic signatures, such as the signatures used for DNS zone signing keys. In various implementations, the systems, methods, and computer products may perform, execute or enable operations, functions, and/or behaviors that include: obtaining a first electronic signature on a mid-level public key and information associated with the mid-level public key, wherein the first electronic signature is validatable by a high-level public key; obtaining a low-level public key and information associated with the low-level public key; generating a second electronic signature on the low-level public key and the information associated with the low-level public key, wherein the second electronic signature is validatable by the mid-level public key; and constructing a third electronic signature comprising the mid-level public key, the information associated with the mid-level public key, the first electronic signature and the second electronic signature, wherein the third electronic signature is validatable by the high-level public key.

In various embodiments, the third electronic signature is stored in a DNS record. In some such embodiments, the operations, functions, and/or behaviors further include storing the third electronic signature in a signature field of the DNS record.

In various embodiments, the low-level public key and the second electronic signature are stored in a DNS record. In some such embodiments, the operations, functions, and/or behaviors further include storing the low-level public key and the second electronic signature in a key field of the DNS record.

In various embodiments, the third electronic signature is a flattened electronic signature.

Still other embodiments include systems, methods, and computer products and media for validating an electronic signature, such as a flattened electronic signature, which may be a signature used for a DNS zone signing key. In various implementations, the systems, methods, and computer products may perform, execute or enable operations, functions, and/or behaviors that include: obtaining: a mid-level public key, information associated with the mid-level public key, a first electronic signature on the mid-level public key and the information associated with the mid-level public key, and a second electronic signature on a low-level public key and information associated with the low-level public key; validating, using a high-level public key, the first electronic signature; and validating, using the mid-level public key, the second electronic signature.

In various embodiments, an electronic signature comprises the mid-level public key, the first electronic signature, and the second electronic signature, wherein the obtaining comprises: obtaining the electronic signature. In some such embodiments, the electronic signature is a flattened electronic signature. In some further embodiments, the electronic signature is stored in a DNS record. In yet further embodiments, obtaining the electronic signature includes: obtaining the electronic signature from a signature field of the DNS record.

In various embodiments, the low-level public key and the second electronic signature are stored in a DNS record. In some such embodiments, the obtaining includes: obtaining the low-level public key and the second electronic signature from a key field of the DNS record.

It is intended that combinations of the above-described elements and those within the specification may be made, except where otherwise contradictory.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Figure 1:
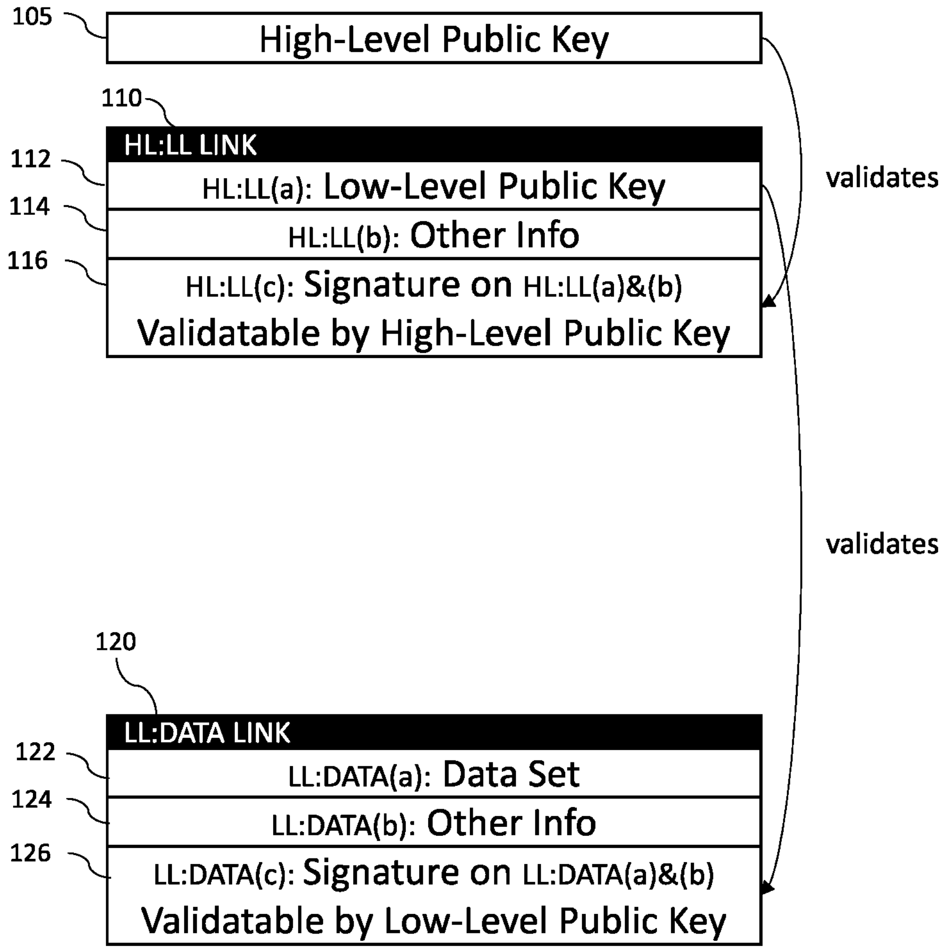
FIG. 1 is a block diagram illustrating an example of two-level, non-periodic key signing, according to various embodiments.

Reference will now be made in detail to example implementations, illustrated in the accompanying drawings. Wherever desirable, the same reference numbers will be used throughout the drawings to refer to the same or like parts. In the following description, reference is made to the accompanying drawings that form a part thereof, and in which is shown by way of illustration examples of embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, for purposes of explanation.

I. Introduction

The synthesized ZSK approach, such as described in U.S. Pat. No. 10,153,905 issued on 11 Dec. 2018, may include techniques for making DNSSEC "quantum-safe" by introducing a digital signature algorithm resistant, and perhaps invulnerable in practice, to future attacks by quantum computers. Techniques based on a hash function are particularly attractive because hash functions are well understood, are considered resistant to known quantum computing attacks, and the cryptographic community has experience designing, implementing, and deploying hash functions, as well as experience replacing them as needed. However, a signature algorithm based on a hash function typically involves a large signature size, relative to the current size of DNSSEC signatures and the operational constraints of DNSSEC. The synthesized ZSK approach provides an alternative with smaller signature sizes, which may make hash-based techniques more practical for signing DNS records with ZSKs. The synthesized ZSK approach can help protect all records in a zone, except for the DNSKEY record that carries the ZSK itself. According to an embodiment, the DNSKEY record that carries the ZSK may also be protected with a synthesized signing approach involving a higher-level key.

According to an embodiment, in the synthesized ZSK approach, signatures on DNS resource records are formed differently than in an ordinary signature scheme. Instead of generating a public key/private key pair and then signing resource records using the private key to obtain their signatures, as contemplated by the ordinary signature scheme, the public key is obtained by forming a Merkle tree from the resource records (and other signature fields such as a validity period), and the signatures are obtained from the authentication paths through the Merkle tree, as contemplated by the synthesized ZSK approach. In either case, a relying party may validate the signature on a resource record using the public key. The difference is that, for the ordinary signature scheme, the public key may be generated before it is known which records will be signed, and in the synthesized ZSK approach, the public key is only obtained after the records to be signed are available.

The delay in the synthesized ZSK becoming known introduces potential complications in the process for generating a signature on the synthesized public key using a key at the next higher level of the DNSSEC key hierarchy. In a conventional scenario where the public key is non-synthesized, the next-level signature may be generated on a periodic basis, for instance in predetermined intervals such as once a quarter (i.e., once every 3 months) in a key signing ceremony, and applied to one or more public keys to be used for a period of time until the next key signing ceremony. This scenario is not applicable to synthesized public keys generated between ceremonies, so a different key-signing approach may be needed.

A possible first approach is to diverge from the conventional use of key signing ceremonies for high-level keys and use the high-level keys in between ceremonies to sign the synthesized ZSKs, e.g., the synthesized public keys. However, this has the drawback of introducing security risks to the high-level signing keys. A possible second approach is to diverge from the conventional use of a two-level key hierarchy and introduce mid-level keys for signing the synthesized public keys. However, in a DNS use case, this has the drawback of requiring changes to the DNSSEC architecture, which is currently limited to a predetermined number of levels of keys (e.g., two levels of keys) per zone.

Various embodiments described herein avoid these drawbacks by taking the approach of introducing mid-level keys and "flattening" a high-level signature on one or more mid-level keys and a mid-level signature on one or more synthesized public keys into a single level. Such embodiments have the advantages of both the first and second approaches described above, without the drawbacks of either. Moreover, although certain embodiments are described herein as flattening a three-level hierarchy into a two-level hierarchy, the embodiments are not limited to a any specific number of levels. In some embodiments, multiple levels of keys and signatures in an input hierarchy may be flattened into a level of an output hierarchy, wherein a flattened signature at each such output level is comprised of a signature chain wherein the signature chain is comprised of a succession of signatures by higher-level key on next lower-level keys.

Various embodiments described herein may complement the synthesized ZSK approach by protecting the DNSKEY record, while addressing practical considerations needed by DNS. Embodiments described herein for the DNS use case fit within the two levels of keys per zone required by the DNSSEC architecture and use KSKs periodically, rather than between key signing ceremonies (or between the comparable processes for public-key infrastructure (PKI) use cases). By using mid-level keys, embodiments provide flexibility for the high-level key itself to be a synthesized public key, which can reduce the size of the combined high-level/mid-level signature.

In some embodiments described in detail below, the mid-level signature is performed with a conventional ZSK, which has the advantage that only the signature algorithm in the key signing ceremony may need to be changed, for example, to a basic post-quantum or quantum-safe algorithm. The ceremony would not otherwise be affected by the synthesized ZSKs or flattened signatures. Thus, embodiments described herein can be gradually deployed by zone operators and resolvers, with backward compatibility (to the basic post-quantum algorithm) for those who have not deployed the techniques described herein.

Although certain embodiments are described herein with respect to hash-based techniques, the embodiments are not limited to hash-based techniques, which allows the mid-level (and possibly high-level) signature to involve non-hash-based signature techniques, including signature algorithms from a different post-quantum algorithm family, and/or from a non-post-quantum algorithm family in other embodiments, if desired. Similarly, the low-level signature could involve techniques for producing synthesized public keys and associated signatures that are not hash-based.

I. Two-Level Signing with Non-Periodic Key Signing

Some embodiments of the electronic signing systems and methods described herein diverge from the conventional, periodic use of the next-level private key by using non-periodic key signing, rather than "in advance" key signing. For example, the key signing may be performed on-demand or as-needed. One such embodiment is illustrated in FIG. 1, which shows a high-level (HL) public key 105 (the next-level key) and a low-level (LL) public key 112 (the synthesized public key), from the perspective of the information included in the signatures. According to an embodiment, an HL operator may generate the signature on the LL public key at any time. For example, the HL operator may be an entity that directs a key signing ceremony and manages the KSKs for a zone, such as a zone administrator or a TLD operator that manages the TLD KSKs. An LL operator, for example, may be an entity that performs zone signing operations and manages the ZSKs for a zone, such as a zone operator, a Root Zone Maintainer in its role to sign records in the root zone, or a TLD operator in its role to sign records in the TLD zone. A routine or ceremonial schedule may be used, but in embodiments where the schedule is accelerated, e.g., through automation, then the HL private key's signature on the LL public key 112 may be computed as needed when the LL public key 112 is generated.

Figure 3:
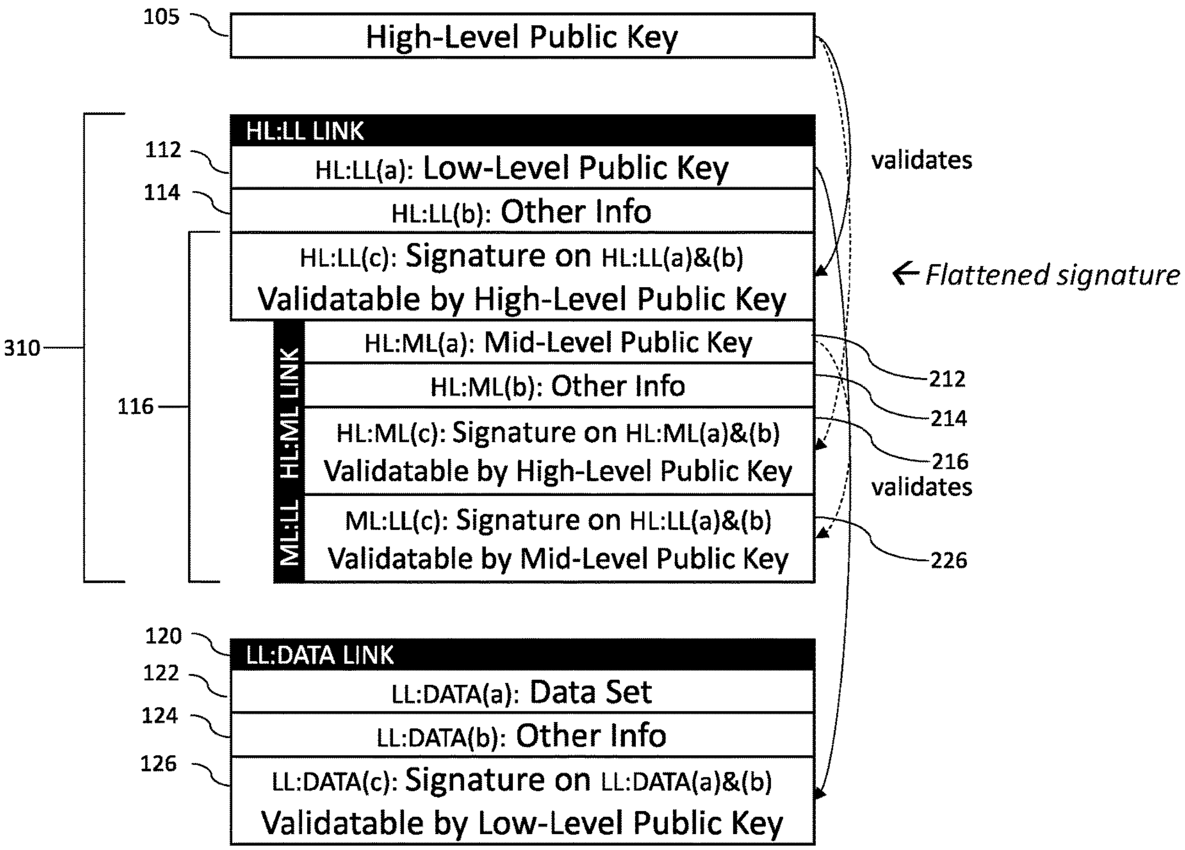
FIG. 3 is a block diagram illustrating an example of flattened signatures, according to various embodiments.

For notational reference in FIGS. 1 and 3, HL:LL link 110, 310 may refer to a link in the DNSSEC trust chain (or a similar trust chain in public-key infrastructure embodiments or other embodiments and use cases of the concepts described herein) that connects the HL public key 105 to the LL public key 112. In the example shown in FIG. 1, the link 110 may comprise or consist of three parts: (a) the LL public key 112; (b) other information 114 associated with the LL public key 112 in the link 110, such as a validity period or identifier; and (c) the signature 116 on the foregoing, e.g., on the concatenation of, or on another value derived from, the LL public key 112 and the other information 114. LL:DATA link 120 refers to the link that connects the LL public key 112 to a data set being signed. In this example, the LL:DATA link 120 may comprise or consist of three parts: (a) the data set 122; (b) other information 124 associated with the data set 122; and (c) the signature 126. For both links 110, 120, the signature may be validated by the public key at a level above the signature that is being validated, such as the next or subsequent level above the signature that is being validated. In embodiments using the synthesized public key approach, the signature may be derived from the records being signed, whereas in a non-synthesized approach, the signature may be generated using a private key.

One exemplary advantage, among others, of the two-level key signing approach illustrated in FIG. 1 is that it matches the use of a KSK and ZSK in DNSSEC for signature verification, as well as the use of keys for similar purposes in two-level PKI use cases. As known to one of ordinary skill in the art, this approach diverges from the conventional DNSSEC use of periodic key signing ceremonies for signature generation with high-level keys.

In the example of FIG. 1, only one public key 105, 112 at each level is shown. In other embodiments, there may be more than one public key at each level or at one or more levels, though typically not at the high level except during key rollovers.

In some embodiments (not shown in FIG. 1), of a first arrangement, different public keys at a given level may be associated with different signatures, e.g., a first LL public key HL:LL(a)(1) may be associated with a first other information HL:LL(b)(1) and a first signature HL:LL(c)(1), while a second LL public key HL:LL(a)(2) may be associated with a second other information HL:LL(b)(2) and a second signature HL:LL(c)(2).

In some embodiments, of a second arrangement, different public keys may be associated with the same signature, e.g., a first LL public key HL:LL(a)(1) and a second LL public key HL:LL(a)(2) may be associated with the same first other information HL:LL(b)(1) and the same first signature HL:LL(c)(1) (so that the second LL public key HL:LL(a)(2) may be considered part of the first other information). Alternatively, the first LL public key HL:LL(a)(1) and the second LL public key HL:LL(a)(2) may be associated with different first other information HL:LL(b)(1) and second other information HL:LL(b)(2) and the same first signature HL:LL(c)(1).

According to an embodiment, the PKI use cases may follow the first arrangement described above with different signatures (in the context of different certificates), for different public keys. According to an embodiment they may also group multiple public keys in the same certificate following the second arrangement described above. DNSSEC follows the second arrangement with multiple public keys at a given level in the same DNSKEY resource record set (RRset).

In still other embodiments, there may also be multiple signatures on the same public key or set of public keys, as well as on the same data set, as supported both in DNSSEC (e.g; with multiple RRSIG records on a given RRset) and some PKI use cases (e.g., with multiple signatures on the same certificate or other data set).

III. Three-Level Signing

Figure 2A:
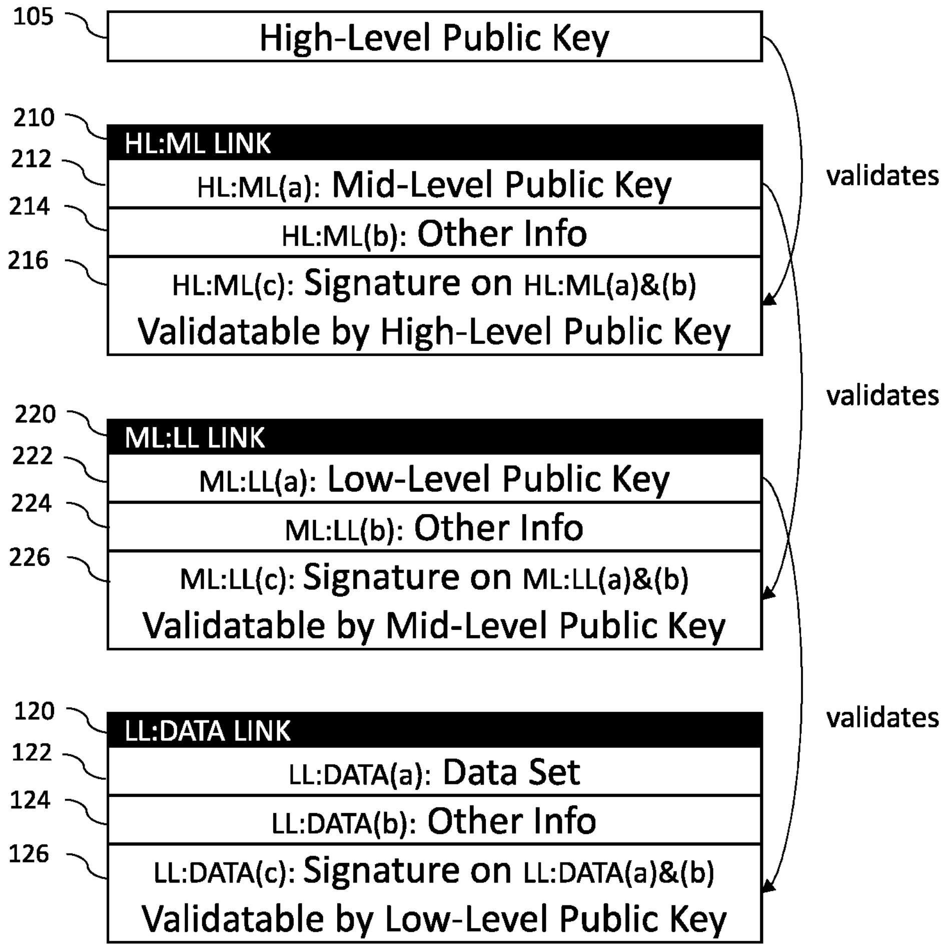
FIG. 2A is a block diagram illustrating an example of three-level key signing, according to various embodiments.

Another embodiment of the electronic signing systems and methods described herein is illustrated in FIG. 2A. The example shown in FIG. 2A illustrates a three-level approach and introduces a mid-level (ML) public key/private key pair. This embodiment shows, in addition to the HL public key 105 and LL public key 222 like those in FIG. 1, an ML public key 212. According to an embodiment, the HL operator may generate the signature 216 on the ML public key periodically. The use of the ML public key 212 may then be accelerated, so that the ML private key's signature 226 on the LL public key may be computed as needed when the LL public key 222 is generated.

The notation of FIG. 2A is similar to that of FIG. 1, with the HL:LL link 110 being replaced by two links, HL:ML 210 and ML:LL 220, and with the elements within them (212, 214, 216, 222, 224, and 226) being similar to the elements in the HL:LL link 110 and being relabeled accordingly. The LL:DATA link 120 refers to the link that connects the LL public key 222 to a data set being signed. In this example, the LL:DATA link 120 may comprise or consist of three parts: (a) the data set 122; (b) other information 124 associated with the data set 122; and (c) the signature 126.

One exemplary advantage, among others, of this three-level key signing approach is that it aligns with the conventional use of periodic key signing ceremonies for high-level keys. As known to one of ordinary skill in the art, however, this approach diverges from the conventional use of a KSK and ZSK in DNSSEC, as well as two-level PKI use cases. In particular, FIG. 2A is not compatible with the requirement in the current DNSSEC standard that any public keys used for signing within a zone must be published in a DNSKEY record at the zone apex (which means that all public keys, including the ZSK, have to be signed by a KSK, i.e., LL by HL, unless the zone has only one level of keys, in which case the KSK and the ZSK are the same and the KSK/ZSK signs itself). It may be easier to change PKI structures, but still an additional "link" (e.g., certificate) would be required, which may increase implementation complexity. The current DNSSEC architecture may be changed to accommodate three-level key signing (or more levels than three) by allowing public keys used for signing to be associated with locations in the zone (i.e., identified by domain names) other than the zone apex. In particular, the definition of the Signer's Name field of the RRSIG record, which IETF RFC 4035 states "is equal to the name of the zone containing the RRset," i.e., the zone apex name, could be changed to allow it to specify the signer's name to be a domain name within the zone that is not equal to the zone apex. The LL:DATA link could then specify this alternate location. Relying parties would then obtain a public key from a DNSKEY RRset published at the specified alternate location, subject to further DNSSEC validation on the DNSKEY RRset (which may in turn reference a public key published elsewhere in the zone). This variant may have the further advantage that different LL public keys could be stored at different locations, which may be convenient if the LL public key is changing frequently, compared to managing many LL public keys in the same location, e.g., the apex. However, such a change may increase implementation complexity compared to the current architecture. Therefore, according to certain embodiments, it would be advantageous to maintain the current architecture, yet still obtain the benefits of a three-level signing approach.

Figure 2B:
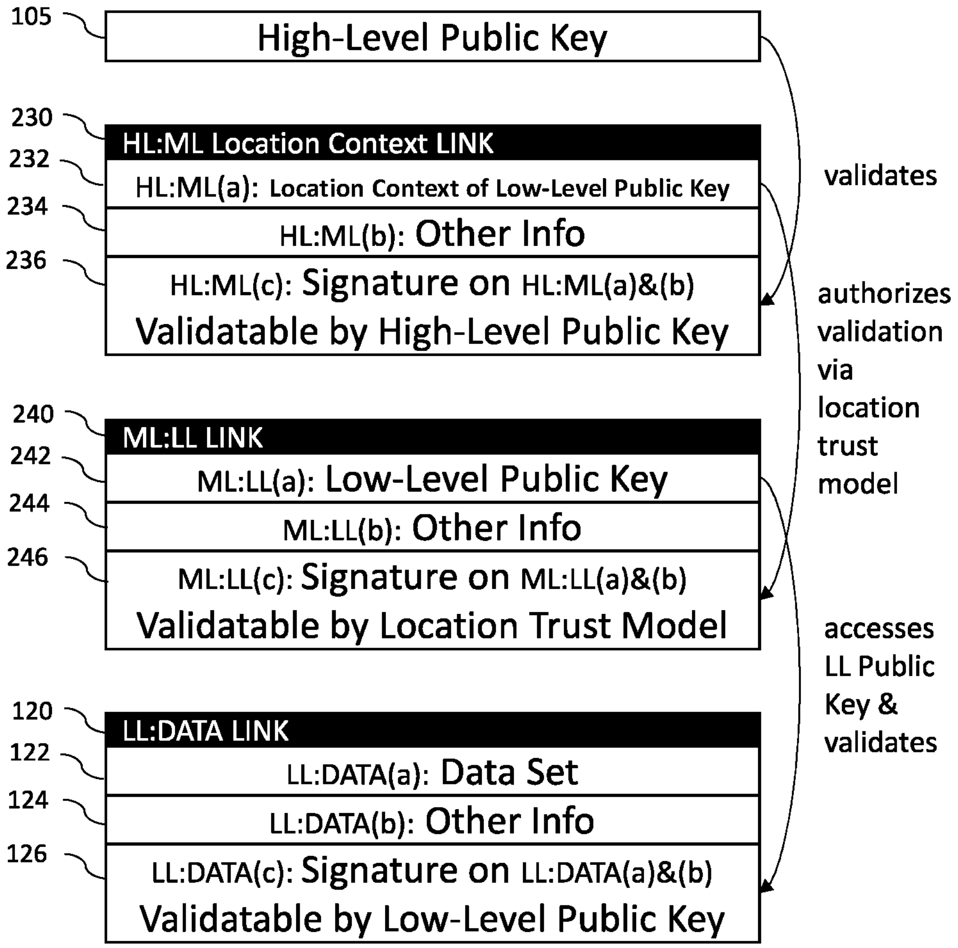
FIG. 2B is a block diagram illustrating an example of a variant of the three-level key signing, according to various embodiments.

FIG. 2B illustrates an alternative variant. In particular embodiments, an LL public key may be published at a location other than the zone apex. This variant may be particularly advantageous when the LL public key is a synthesized public key by separating the location management and validation of the synthesized public key from the main DNSKEY RRset. As in the example illustrated in FIG. 2A, FIG. 2B illustrates that HL:ML location context link 230 may refer to a link in the DNSSEC trust chain (or a similar trust chain in public-key infrastructure embodiments or other embodiments and use cases of the concepts described herein) that connects a HL public key 105 to a location context 232, e.g., DNS name or Uniform Resource Identifier. The link 230 may comprise or consist of three parts: (a) a location context 232; (b) other information 234 associated with the location context 232, such as a validity period or identifier; and (c) the signature 236 on the foregoing, e.g., on the concatenation of, or on another value derived from, the location context 212 and the other information 214. ML:LL link 240 may refer to a link in the DNSSEC trust chain that connects the location context 232 to the LL public key 242. ML:LL link 240 may comprise ML:LL (a) the LL public key 242; ML:LL(b) other information 244 associated with the LL public key 242; and ML:LL(c) the signature 246 on the LL public key 242 and the other information 244.

To validate data set 122 in the LL:DATA link 120, a relying party may validate the signature 236 on HL:ML(a) and (b). After that, the relying party may validate ML:LL(c) 246 using a location public key or another location-specific trust mechanism, which may be obtained and/or validated through the location's trust model, optionally in conjunction with information about how to obtain the public key (e.g., a key identifier) or how to implement the other location-specific trust mechanism; such information may be provided in ML:LL(b) 244 and/or ML:LL(c) 246. If the location is in a DNS zone (including both at the apex and at other locations, in the present or a different zone), then the location public key may be a KSK or a ZSK, including a conventional ZSK or a synthesized ZSK, and including another ML public key or LL public key. Alternatively, the location's trust model may involve other PKI techniques and may or may not involve a DNSKEY record and/or an RRSIG record to convey the LL public key and the signature thereon. The relying party may then verify the signature on the synthesized LL public key using the location public key, before the relying party verifies the direct information in the signature 126, such as the authentication path associated with the synthesized LL public key. The LL:DATA link 120 may also comprise (e.g., in LL:DATA(b) 124 or LL:DATA (c) 126) indirect information about the location of ML:LL LINK 240, which may be combined with the location context 232 to determine and then access the location of ML:LL LINK 240. In this way, location context 232 takes the place of an ML public key in connecting the HL public key to the LL public key. In particular, HL:ML location link authorizes the use of the location's trust model as an intermediary between HL and LL. The relying party may validate the LL:DATA(c) 126 which comprises a signature on LL:DATA(a) 122 and LL:DATA(b) 124 using the synthesized LL public key. The relying party may access the data set 122 and other information 124 associated with the data set.

IV. Flattened Signatures

Another embodiment of the electronic signing systems and methods described herein is illustrated in FIG. 3. The example shown in FIG. 3 brings certain advantages of both of the embodiments shown in FIGS. 1 and 2 by flattening or collapsing two levels, such as the first and second levels, into one level. In the DNS use case, for example, various implementations of flattened signatures can represent signatures from both levels as a single signature comprising distinct levels of keys. Other implementations can represent a signature from one level as part of a key, and from another level as part of a signature.

Like the two-level signing embodiment of FIG. 1, the embodiment of FIG. 3 has only two architectural levels, the HL:LL link 310 and the LL:DATA link 120. Accordingly, for example, this embodiment is compatible with or supports a two-level DNSSEC or PKI architecture.

In addition, like the three-level signing embodiment of FIG. 2A, the embodiment of FIG. 3 has three "internal" levels, because it involves an ML public key 212. Accordingly, for example, this embodiment is compatible with or supports the periodic use of the HL private key.

According to an embodiment, the HL operator may periodically provide, to an LL operator, the HL:ML(c) signature 216 on information comprising or consisting of, or information capable of validating information comprising or consisting of:

i. HL:ML(a), which is the ML public key 212; and/or
ii. HL:ML(b), which is the other information 214 associated with the ML public key 212;

where the signature 216 can be validated with the HL public key 105.

In some such embodiments, the HL operator may also provide the ML public key 212 to the LL operator, for instance if the HL operator generates or otherwise obtains the ML public key 212 and a corresponding ML private key.

An exemplary advantage of this embodiment, among others, is that the HL operator may generate or otherwise obtain one or more ML public keys 212 and corresponding private keys in advance of providing them to the LL operator, and then derive the HL public key 105 from the various ML public keys and associated other information. The HL operator may then follow the synthesized public key approach to generate the various signatures on ML public keys and associated other information.

According to an embodiment, the HL operator may also generate the various signatures with a stateful or stateless hash-based signature algorithm, or with any other signature algorithm known to one of ordinary skill in the art, using an HL private key corresponding to the HL public key 105.

In some embodiments, the LL operator may provide the ML public key 212 to the HL operator for input to the signature operation, for instance if the LL operator generates or otherwise obtains the mid-level public key 212 and a corresponding mid-level private key. In this case, as the HL operator would not necessarily have the ML public keys in advance of obtaining them from the LL operator, the HL operator may not be able to derive the HL public key from the various ML public keys. The HL operator may nevertheless generate the various signatures with a stateful or stateless hash-based signature algorithm, or with other signature algorithms known to one of ordinary skill in the art, not following the synthesized public key approach, using an HL private key corresponding to the HL public key 105.

Once the LL operator has obtained the LL public key 112, the associated other information 114, and the signature 116 on the foregoing, the LL operator may then construct an HL:LL link 310 by which a relying party may validate the LL public key 112, based on knowledge of the HL public key 105. In some embodiments, for example, the relying party may be a DNS resolver (e.g., a recursive DNS resolver), a client that performs DNSSEC validation, and/or a client or server that performs certificate or signature validation. As shown in the example of FIG. 3, the HL:LL link 310 may comprise or consist of the following elements:

i. HL:LL(a), which is an LL public key 112;
ii. HL:LL(b), which is other information 114 associated with the LL public key 112; and
iii. HL:LL(c), which is a signature 116 based on HL:LL(a) and HL:LL(b), where the signature can be validated with the HL public key 105.

The HL:LL(c) signature 116 may itself comprise the following elements:

i. HL:ML(a), which is the ML public key 212;
ii. HL:ML(b), which is the other information 214 associated with the ML public key 212;
iii. HL:ML(c), which is a signature 216 based on HL:ML (a) and HL:ML(b) that can be validated with the HL public key 105; and
iv. ML:LL(c), which is a signature 226 based on HL:LL (a) and HL:LL(b), where the signature can be validated with the ML public key 212.

The fourth element, the ML:LL(c) signature 226, is the only one that explicitly depends on the LL public key 112. This signature 226 as described does not depend on the HL public key 105 (although in other embodiments signature 226 could depend on the HL public key 105). The other three elements 212, 214, 216 of the HL:LL(c) signature 116 may therefore be obtained independently of the LL public key 112, e.g., via the interaction between the HL operator and the LL operator described above, and the fourth element 226 may be obtained without involving the HL operator.

After interacting with the HL operator, the LL operator has the first three elements 212, 214, 216. To obtain HL:LL (c) 116, the LL operator generates the fourth element ML:LL (c) 226. In other words, the LL operator generates a signature 226 on HL:LL(a) and HL:LL(b), where the signature can be validated with the ML public key 212. The full HL:LL(c) signature 116 (comprising the elements 212, 214, 216, and 226), may then be included, per established protocols, in the place where signatures conventionally would go, e.g., in the RRSIG record for a DNSKEY RRset, where the RRset includes the LL public key 112 in the DNSSEC use case; or in the signature field in a certificate use case, etc.

Because the ML public key 212 is signed with the HL public key 105 before the LL public key 112 is signed, the ML public key 212 is not a synthesized public key, and it has an ML private key. Instead, the LL operator may generate the signature 226 on HL:LL(a) and HL:LL(b) using the ML private key with a stateful or stateless hash-based signature algorithm or with other signature algorithms.

According to an embodiment, other LL public keys, such as non-synthesized public keys, may be included in the set of information that can be validated directly with the HL public key, in addition to the ML public key. This is comparable to three-level signing where one or more of the LL public keys are directly validatable by the HL public key. For example, one or more of the LL public keys may be a conventional ZSK, the HL public key may be a KSK, and the conventional ZSK(s) may be signed by the KSK private key, as in conventional DNSSEC. In addition, one or more of the LL public keys may be a synthesized ZSK. The ML public key may be as described above, and may validate the LL public keys that are synthesized ZSKs. The HL public key 105 may then validate a combination of LL public keys and ML public keys, so that HL:ML(c) 216 is a signature on both types of keys.

A relying party may validate HL:LL(c) 116 with a process that includes the following operations or an equivalent or similar sequence of steps:

1. Process HL:LL(c) 116 to obtain the ML public key 212, the information 214 associated with the ML public key, and the signature 216 on the foregoing;
2. Validate the signature 216 using the HL public key 105;
3. Process HL:LL(c) 116 to obtain ML:LL(c) 226; and
4. Validate ML:LL(c) 226 using the ML public key 212.

In effect, the HL:LL link 310 combines the two levels of signatures from FIG. 2A: the HL:ML link 210, comprising HL:ML(a) 212, HL:ML(b) 214, and HL:ML(c) 216; and the ML:LL link 220, comprising ML:LL(a) 222, ML:LL(b) 224, and ML:LL(c) 226. The two levels are therefore collapsed, or flattened, into one level. For example, the value HL:LL(c) 116, which comprises information from both levels, may be considered a collapsed or flattened signature.

As a comparison between the embodiment shown in FIG. 2A and the embodiment of FIG. 3, FIG. 2A includes ML:LL(a) 222 and ML:LL(b) 224 as input to the second-level signature ML:LL(c) 226, whereas FIG. 3 includes HL:LL(a) 112 and HL:LL(b) 114 as input to the second-level signature ML:LL(c) 226. The difference is due to the fact that in the embodiment of FIG. 3, ML-related information may be internal to the processing of the signature, and the relying party may be outwardly aware of only HL and LL, similar to FIG. 1. Therefore, the outward naming convention chosen for FIG. 3 follows that of FIG. 1.

In some embodiments, when processing the signature 116 in FIG. 3, the relying party may handle HL:LL(a) 112 and HL:LL(b) 114 similarly to how it handles ML:LL(a) 212 and ML:LL(b) 214 in FIG. 2A. In other embodiments, the relying party may handle HL:LL(a) 112 and HL:LL(b) 114 differently during signature processing. For instance, if some of the information in HL:LL(a) 112 and HL:LL(b) 114, such as information about a validity period, is also included in, or implied by, HL:ML(a) 212 and HL:ML(b) 214, then such embodiments may not input the same information into the signature operation or the signature validation operation for ML:LL(c) 216. In addition, if some of the information in HL:ML(a) 212 and HL:ML(b) 214 is also included in or implied by HL:LL(a) 112 and HL:LL(b) 114, then such embodiments may not include this information explicitly within a representation of the elements of HL:LL(c) 116. More generally, the processing of HL:ML(c) signature 216 (and the associated values HL:ML(a) 212 and HL:ML(b) 214) may impose constraints on the processing of signature ML:LL(c) 226 (and its associated values HL:LL(a) and HL:LL(b)). For example, this processing may constrain which public keys may be included in HL:LL(a) 112 and HL:LL(b) 114, the attributes of those public keys, and the validity period of the signature HL:LL(c) 116. Such constraints may be enforced by a relying party when validating the signature HL:LL(c) 116. These constraints may limit the power of the ML key pair so that its use by the LL operator is compatible with how the HL key pair may be used by the HL operator in the two-level approach. The limitation is consistent with the ML key pair being internal to the architecture of the three-level approach. The HL:LL(c) signature 116, from an external perspective, may be understood by a relying party as having been produced by or on behalf of the HL operator. As a further example, according to the DNSSEC specifications, in the two-level approach, an HL operator may revoke an HL public key by including a "revoke" bit in the other information HL:LL(b) 114, and then generating the HL:LL(c) signature 116 on the foregoing with the HL private key. Such an approach may ensure, for example, that the HL:LL(a) public key 112 may only be revoked by the holder of the corresponding HL public key. For this reason, some embodiments of this three-level approach may limit the power of the ML key pair, so that the "revoke" bit may be set for an HL public key if and only if the HL:ML(c) signature 216 generated by the HL operator authenticates that the HL operator intended to revoke the HL public key 116, e.g., if and only if the other information HL:ML(b) 214 input to the signature generated with the HL private key (whether or not explicitly represented in the corresponding part of the flattened signature) includes the "revoke" bit for this public key. Such a constraint would ensure that the LL operator, via its use of the ML key pair, cannot revoke the HL:LL(a) public key 116 on its own. Similar constraints would ensure that the LL operator cannot designate a new trust anchor on its own, extend a validity period on its own, or perform certain other functions on its own.

If the set of information that can be validated directly with the HL public key 105 includes both conventional LL public keys and ML public keys, then HL:LL(a) 112 may include both the directly validatable LL public keys and the indirectly validatable LL public keys (where the indirection is via an ML public key). According to an embodiment, one such LL public key may be considered to be HL:LL(a) 112, and the other LL public keys, and any other public keys included, may be considered to be part of HL:LL(b) 114. In various embodiments for this case, HL:ML(a) 212 may be implemented to include both the directly validatable LL public keys and the ML public keys, both of which are directly validatable by the HL public key 105. According to an embodiment, one such ML public key may be considered to be HL:ML(a) 212 and the other public keys to be HL:ML(b):214. The directly validatable LL public keys may therefore be included in both HL:LL(a) 112 and HL:ML(a) 212 (and possibly in HL:LL(b) 114 and HL:ML(b):214 as noted) and therefore may not need to be included explicitly within a representation of the elements of HL:LL(c) 116. For example, the representation of HL:ML(a) 212 within HL:LL(c) 116 may include references to the directly validatable LL public keys, (for example, references in the form of a key tag, a hash, an index number, or the like), rather than the actual public keys, in addition to the ML public keys. In various such embodiments, the HL:LL(c) signature 116 may include a flag that indicates whether a reference or an actual public key is presented.

In various embodiments, the input to the signature operation for ML:LL(c) 226 may include only the indirectly validatable LL public keys and associated information, not the directly validatable LL public keys. In some embodiments, this arrangement may be indicated by a flag. Whether the representation of HL:ML(a) 212 includes references to the directly validatable LL public keys or to the actual public keys, because the indirectly validatable LL public keys are not included among them, the relying party can determine which of the keys in the HL:LL(a) 112 are the indirectly validatable LL public keys and therefore should be included in the input to the signature operation for ML:LL(c) 226. An exemplary advantage of this approach, among others, is that the directly validatable public keys may be validated without involving the ML public keys. If the ML:LL(c) signatures cannot be updated in a timely fashion, then it may not be possible to validate the indirectly validatable LL public keys, but as long as the HL:ML(c) signatures are available (which they are, as one of the elements output by the ceremony), the directly validatable LL public keys may be validated. Thus, any direct signatures on data may still be validated.

V. Delegated One-Time Private Keys

In some implementations of the flattened signature embodiment shown in FIG. 3, the LL public key 112 may be a synthesized public key. The ML public key 212 would be non-synthesized. It may be hash-based, either stateful or stateless, or non-hash-based. And, the HL public key 105 may be hash-based or non-hash-based, and it may be synthesized or non-synthesized.

Embodiments having the combination of a synthesized, hash-based HL public key with a stateful hash-based ML public key may bear resemblance to a "delegated one-time private key" variant of a stateful hash-based signature scheme as described herein. More specifically: consider a variant of the two-level signing embodiment of FIG. 1, where the HL public key 105 is a stateful, hash-based public key. According to an embodiment, such a public key will correspond to the root of a Merkle tree whose leaves are one-time public keys (or sub-components of such public keys). Each one-time public key, and its corresponding private key, by design, would be used only once. The HL operator may therefore "delegate" to the LL operator a set of one-time private keys to be used to compute HL signatures during a given validity period. According to an embodiment, the HL operator may provide information sufficient to determine one-time private keys, e.g., if the one-time private keys are derived from a common private key. Delegated signatures would be cryptographically interchangeable with signatures generated by the HL operator itself.

According to an embodiment, to limit the impact of the compromise of a one-time private key, each one-time private key may be bound to a specific or predetermined validity period. In this way, compromise of a one-time HL private key would have the same effect as compromise of an LL private key: an adversary may be able to generate new signatures during the validity period of the compromised key (or until the compromised key is revoked). For example, the validity period of a one-time private key may be defined as a function of the location of the corresponding one-time public key in the Merkle tree. For instance, the overall validity period for the public key for the root of Merkle tree may be partitioned into sub-intervals according to some defined arrangement. The sub-intervals may be overlapping and may have fixed or variable lengths, as long as the arrangement is known to or validatable by the relying party who is validating the signatures. The validity period may also be included as an input to the hash operation when constructing the Merkle tree, again with the assumption that the relying party knows to interpret the input as the key's validity period. In other embodiments, a validity period for an OTS key may be bound to a validity period for a node above it in the Merkle tree that it is related to.

The resemblance of synthesized hash-based HL+stateful hash-based ML is as follows. For example, a one-time public key may be considered as an ML public key. More generally, a set of one-time public keys may be considered as a stateful ML public key (e.g., with each public key in the set being used once). According to an embodiment, similar concepts may be applied to signature schemes that are "few-time," such as where each public/private key pair can be used more than once, but not much more (e.g., less than a predetermined number of times). The one-time public keys in the set may be effectively signed through their inclusion in the Merkle tree. The Merkle tree therefore may serve as a synthesized HL public key over the stateful ML public keys. The delegated signature may include both the Merkle tree authentication path to the ML public key, and the ML private key's signature, so it may be considered a flattened signature. However, this is a specific flattened signature, which may be limited to the case where a stateful hash-based/Merkle tree-based signature is revisited as a combination of a synthesized HL and a stateful ML. The flattened signature approach described with respect to FIG. 3 is more general, and not limited to this special case, which is another advantage to the embodiments described herein. In addition, the flattened signature approach combines signature schemes whereas the delegated approach separates a signature scheme into parts. Therefore, the flattened signature scheme may be more compatible with cryptographic module validation programs, such as FIPS 140-3, in that such programs may not directly provide validation support for parts of signature schemes.

In various embodiments, it is possible to perform additional delegations both above and below the HL-to-ML delegation. The delegations above the HL-to-ML delegation enable the HL operator to limit the scope of private key material to a subtree of the Merkle tree for its own purposes (e.g., putting HL private key material for different time periods into different hardware security modules). The delegations below enable the LL operator to manage the scope of the HL private key material given to it (e.g., putting HL private key material, e.g., one-time private keys, for different days into different servers). The delegation points, both for these additional delegations and for the HL-to-ML delegation itself, may vary from one delegation operation to another, e.g., the HL operator may delegate a small number of one-time private keys at one time, and a large number and therefore from a higher delegation point at another time.

VI. Comparison with Hierarchical Signatures

The delegation approach described above in Section V may also be applied to a hash-based signature scheme involving multiple Merkle trees, such as the Hierarchical Signature System/Leighton-Micali Signature (HSS/LMS) algorithm described in IETF RFC 8554, or the eXtended Merkle Signature Scheme/Multi-Tree (XMSS^MT) algorithm described in IETF RFC 8391. In such schemes, the connections between internal Merkle trees at successive levels provide a natural opportunity for delegation. As an example, an instance of the HSS/LMS scheme may have two levels of trees, following the 25/15 parameter set defined in the RFC. The first level tree would be able to sign 2^25 or about 32 million second-level trees. Each tree in the second level would be able to sign 2^15 or about 32 thousand messages. The HL operator may provide to the LL operator the public-key/private-key pair for one or more second-level trees, along with the first-level signatures on the second-level public keys. The LL operator would then be able to generate signatures on messages with the second-level private keys. For example, the HL operator may give the LL operator a cryptographic module that contains a second-level private key and that is capable of generating signatures on messages with the second-level private key. The cryptographic module may also have previously generated the second-level public-key/private-key pair. Alternatively, the LL operator may already have a cryptographic module that contains a second-level private key and that is capable of generating signatures on messages with the second-level private key. The LL operator may then give the second-level public key corresponding to this second-level private key to the HL operator, to be signed by the first level tree.

As noted above, the resulting signatures may be cryptographically interchangeable with signatures generated by the HL operator itself. They also follow a special case of the flattened signature approach described herein, in that the HL:LL(c) signature may be comprised of the first-level signature on the second-level public key (analogous to HL:ML(a), HL:ML(b), and HL:ML(c)), combined with the second-level signature on an LL public key (analogous to ML:LL(c)).

Delegation based on hierarchical signatures may bear a resemblance to a combination of a stateful hash-based HL public key with a stateful hash-based ML public key. The combination may be less efficient in terms of signature size than the combination of a synthesized HL public key with a stateful hash-based ML public key. According to an embodiment, for example, with the HSS/LMS 25/15 parameter set, each HL signature would take 1936 bytes and each ML signature would take an additional 1716 bytes (following Table 3 of RFC 8554); there would be an overhead of another 100 bytes for the combination of the two levels. With a synthesized HL public key, in contrast, each HL signature (assuming a depth of 25 256-bit hash values) would take 800 bytes; each ML signature (assuming the same depth of 15 for comparison) would again take an additional 1716 bytes (and there would be some overhead for the combination of the two levels). This would be a savings of on the order of 1100 bytes, or almost a third of the combined length. The savings reflects the optimization that a synthesized HL public key corresponds to the root of a Merkle tree whose leaves comprise independent, pre-determined public keys, rather than to the root of Merkle tree (or multi-tree) whose leaves comprise one-time (or few-time) public keys capable of signing other, not necessarily pre-determined public keys. The pre-determination of the public keys saves the overhead of a portion of the signature.

The relative savings may be even greater with other parameter sets and other use cases. For instance, the current DNSSEC root private KSK signs nine DNSKEY RRsets per quarter, for a total of 360 signatures in a typical 10-year lifetime. Each RRset may include a KSK public key and two ZSK public keys (i.e., conventional LL public keys) with overlapping validity periods. An ML public key may also be included in each RRset without increasing the number of signatures involved. If the ML private key were to sign one DNSKEY RRset per day, where the RRset includes one or more synthesized ZSK public keys, then 92 total ML signatures would be needed per quarterly ML public key. Given that 360<2^9 and 92<2^7, a 9/7 parameter set may be adequate (though larger sets may be prudent in practice in case additional signature operations are needed in certain circumstances). With such a parameter set, based on interpolating Table 3, each HL signature would take 1424 bytes and each ML signature would take 1360 bytes. In contrast, a synthesized HL signature would take 9*32=288 bytes. The savings would again be on the order of 1100 bytes, well over a third of the combination.

According to an embodiment, if a synthesized HL public key is used then, because this public key is derived from the DNSKEY RRsets that it directly validates, such DNSKEY RRsets could not themselves include the HL public key, to avoid a circularity. However, the synthesized HL public key could be included in the DNSKEY RRset signed by the ML private key.

According to an embodiment, it is possible to do the HL-to-ML delegation within one of the Merkle trees in the multi-tree hierarchy, rather than between the trees, and to perform additional delegations above and below the HL-to-ML delegation in this case, either within a tree or between trees. The delegation point may again vary from one delegation operation to another.

VII. Coexistence of Conventional and Synthesized Signatures on Data Sets

The more data sets that are grouped together for signing in the synthesized public key approach, the fewer synthesized public keys are needed, and therefore the lower average overhead for these public keys and any signatures on them. However, the more data sets that are grouped together, the longer it may take until the LL operator can produce a signature on a given data set. For this reason, it may be beneficial for LL operators to provide both conventional LL and synthesized LL signatures. In such embodiments, a conventional LL signature may be produced immediately after a data set is updated, so the signature would be available right away if needed by a relying party. However, the signature may be long, depending on the signature algorithm. A synthesized LL signature could then be produced once sufficient data sets are available to form a Merkle tree of a certain size, and/or after a certain time period has elapsed, according to the parameters of the implementation. The resulting signature may be short. The two signatures could coexist. Each would be validatable by an LL public key, where the conventional LL public key may be directly validatable by an HL public key, and the synthesized LL public key may be directly validatable by an ML public key.

VIII. Enhanced DNSSEC Compatibility by Reusing ZSKs as ML Public Keys

The approaches and embodiments discussed above have assumed that ML public keys are distinct from LL public keys. In some other embodiments, however, it is also possible for a conventional LL public key to serve as an ML public key. With such an arrangement, data sets as well as synthesized LL public keys may be directly validatable by the same public key, i.e., the dual-role ML/LL public key. An advantage of this arrangement, for example, is its compatibility with existing practice for DNSSEC key signing ceremonies. In the existing practice, a signing ceremony provides a set of ZSK key pairs to the operator, along with a series of signed DNSKEY RRsets each comprising two ZSK public keys and a KSK. Although, as mentioned above, an ML public key may also be included in this set, it may be more convenient, and more consistent with existing practice, not to include a new, distinct ML public key, and instead to reuse the ZSKs as ML public keys. In such embodiments, DNS key signing ceremonies would not need to change the number of public keys included in the DNSKEY RRset to support the embodiments described herein. According to an embodiment, it is possible, but not necessary, that the HL signature algorithm performed by the ceremony may be changed to a hash-based or other post-quantum algorithm; it is also possible, but not necessary, that the conventional LL public key type may be changed. However, such changes may be made independently from the embodiments herein. The ceremony would not even be aware of the potential reuse of the ZSK as an ML public key. According to an embodiment, if the HL public key is a synthesized public key, then the number of public keys included in the DNSKEY RRset that is signed would change, inasmuch as the RRset would no longer include the HL public key, i.e., the KSK. But other changes would also be needed to upgrade to a synthesized HL public key, including the pre-generation of all DNSKEY RRsets to be signed and therefore of all ZSK key pairs, prior to any ceremonies involving the HL public key.

In various embodiments specific to the DNSSEC use case, the various components of the flattened signature may have the following values if a ZSK is reused as an ML public key:

- HL:LL(a) 112 may include the KSK public key, one or more conventional ZSK public keys, and one or more synthesized ZSKs, which may be represented in one or more DNSKEY records;
- HL:LL(b) 114 may include other information associated with HL:LL(a), including a validity period and other fields that may be represented in an RRSIG record; and
- HL:LL(c) 116 may include a signature on the HL:LL(a) and HL:LL(b), which may be represented in an RRSIG record, where the signature can be validated with the HL public key 105, i.e., with the KSK public key, further comprising:
  - HL:ML(a) 212, including the KSK public key (if not a synthesized public key) and the one or more conventional ZSK public keys, which conventionally may be included in a DNSKEY record;
  - HL:ML(b) 214, other information associated with HL:ML(a), including a validity period and other fields that conventionally may be included in an RRSIG record;
  - HL:ML(c) 216, a signature on HL:ML(a) and HL:ML(b) that can be validated with the KSK public key—for example, the signature on the DNSKEY RRset produced during the key signing ceremony, and may conventionally be included in an RRSIG record; and
  - ML:LL(c) 226, a signature on HL:LL(a) and HL:LL(b), where the signature can be validated with the ML public key, i.e., with one of the conventional ZSK public keys—for example, the signature produced by the LL operator, and may also conventionally be included in an RRSIG record.

As previously discussed, because HL:ML(a) 212 or HL:ML(b):214 may include public keys that are also included in HL:LL(a) 112 or HL:LL(b) 114, in some embodiments it may be preferable for HL:LL(a) 112 or HL:LL(b) 114 to reference the public keys rather than to include them explicitly.

In the embodiments described herein, HL:LL(a) 112 may be stored in a key field of a DNSKEY record presented in a zone file and HL:LL(b) 114 may be stored in a key field of a DNSKEY record and/or in an associated RRSIG record presented in a zone file. ML:LL(c) 226 may be stored in a signature field of an associated RRSIG record presented in a zone file.

HL:ML(a) 212 may be stored in a key field of a DNSKEY record produced during a key signing ceremony and HL:ML(b) 214 may be stored in a key field of a DNSKEY record and/or stored in an associated RRSIG record producing during a key signing ceremony. HL:ML(c) 216 may be stored in a signature field of an associated RRSIG record produced during key signing ceremony, HL:ML(a) 212, HL:ML(b) 214 and HL:ML(c) 216 may then together be stored in a signature field of an RRSIG record presented in the zone file, alongside ML:LL(c) as already noted above. HL:ML(a) 212, HL:ML(b) 214 and HL:ML(c) 216 would therefore, for example, be flattened into the zone file's presented signature, e.g., into HL:LL(c) 116.

For further compatibility with current DNSSEC record processing, the three elements HL:ML(a) 212, HL:ML(b) 214 and HL:ML(c) 216 may together be represented as a "pseudo" combined DNSKEY record/RRset and associated RRSIG record inside the zone file's presented signature. That is, the three elements may be encoded as though they were to be published in a zone file (e.g., in the same form in which they were produced during the key signing ceremony), even though they are not being published as ordinary records in the zone file, but only as part of a signature field.

In other embodiments, such as a PKI embodiment, the three elements may be represented as a certificate that is inside the signature on another certificate.

Accordingly, when validating the flattened signature HL:LL(c) 116 in some embodiments, the relying party may validate HL:ML(c) 216 and ML:LL(c) 226 as though the signature had not been flattened, and instead spanned two of the three levels in a three-level signing approach. HL:LL link 310 may accordingly be flattened into a single level DNSKEY RRset/RRSIG combination at the apex level, and processed and validated as though it had not been flattened.

Figure 4:
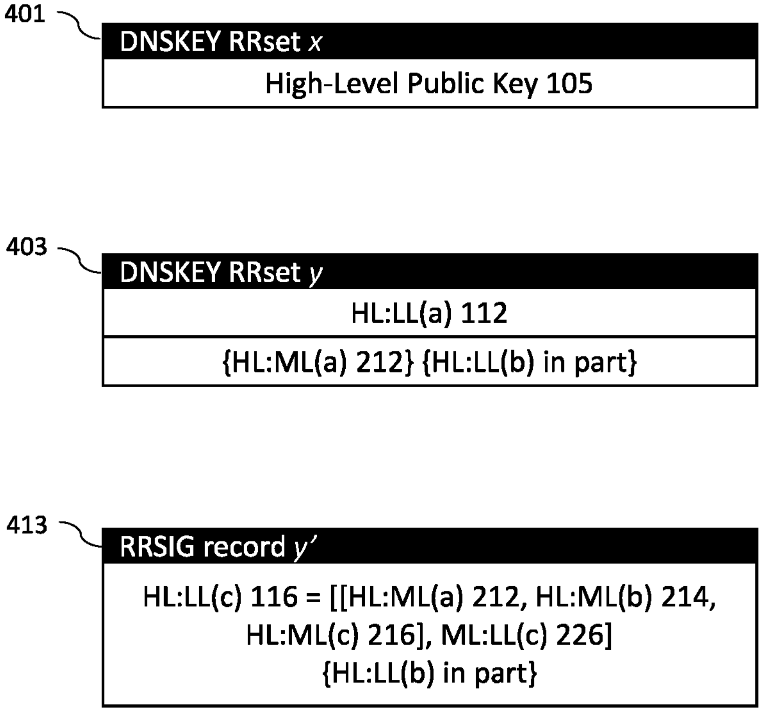
FIG. 4 is a block diagram illustrating a first example physical placement of components for flattened signatures, according to various embodiments.

FIG. 4 illustrates a physical placement of components for an aforementioned scenario. The HL public key 105 may be stored in a key field of a DNSKEY record in DNSKEY RRset x 401. In particular embodiments, DNSKEY RRset x 401 may have additional DNSKEY records. DNSKEY RRset y 403 may comprise two or more DNSKEY records including a first DNSKEY record comprising HL:LL(a) 112 and an optional second DNSKEY record comprising HL:ML(a) 212 and serving as other information HL:LL(b) 114. In some embodiments, HL:LL(b) 114 may comprise HL:ML(a) 212 when a ZSK is reused as an ML public key. In some embodiments, HL:LL(b) 114 may be stored in part or in full in an RRSIG record y' 413 that is associated with DNSKEY RRset y 403. The associated RRSIG record y' 413 may comprise HL:LL(c) 116 which may include a "pseudo" combination DNSKEY record comprising HL:ML(a) 212 and HL:ML(b) 214 and an associated RRSIG record comprising HL:ML(c) 216, along with ML:LL(c) 226.

A relying party may validate the signature HL:LL(c) 116 using the HL public key 105. The validation may comprise two steps. At the first step, the relying party may validate the signature HL:ML(c) 216 on the ML public key, i.e., HL:ML (a) 212, using the HL public key 105. Then, the relying party may be able to validate the signature ML:LL(c) 226 on the LL public key, i.e., HL:LL(a) 112, using the ML public key 212. Once ML:LL(c) is validated, the relying party should be able to use the LL public key 112 to validate any signature associated with the LL public key 112.

As an example, if the keys are associated with the zone example.TLD, then the various elements may be represented in DNSKEY and RRSIG records at the apex of the zone such as the following:

example.TLD. <TTL>IN DNSKEY <flags>3<algorithm>[HL:LL(a)]

example.TLD. <TTL>IN DNSKEY <flags>3<algorithm>[HL:ML(a)]; included when ZSK is reused as ML public key—part of HL:LL(b)

example.TLD. <TTL>IN RRSIG DNSKEY <algorithm>2 [HL:ML(a) HL:ML(b) HL:ML(c) ML:LL (c)]—first three elements are pseudo combination of DNSKEY and RRSIG for HL:ML Here, the first two records comprise a DNSKEY RRset representing a low-level public key HL:LL(a) and a mid-level public key HL:ML(a) (which may also be considered as additional information associated with the low-level public key HL:LL(a)). The third record comprises an RRSIG record on the DNSKEY RRset, and includes a representation of the elements of the flattened signature HL:LL(c). (This is a general outline. An embodiment would follow the DNSSEC specifications which may include additional inputs to processing for various signature generation and validation.)

Because the ZSK is reused as an ML public key, ML:LL (c) 226 can be produced by the same zone signing operation as other signatures involving the ZSK. According to an embodiment, even though the HL public key, i.e., the KSK public key, cannot be included in HL:ML(b) 214 if it is a synthesized public key, it can be included in HL:LL(b) 114 because HL:LL(b) 114 is signed by the ML private key, i.e., by the ZSK private key. Therefore, the presented version of the DNSKEY RRset can be compatible with existing DNSSEC practice, i.e., it may include the KSK public key (with the appearance of having been signed by the KSK private key).

In various other embodiments based on DNSSEC, the elements of the HL:LL link 310 may be represented as follows. HL:LL(a) 112, HL:LL(b) 114 and ML:LL(c) 226 may be represented as a pseudo combined DNSKEY record/RRset and associated RRSIG record, and stored in a key field of a DNSKEY record presented in a zone file. HL:ML (a) 212, which may be a ZSK, may be stored in a key field of a DNSKEY record presented in a zone file, and HL:ML (b) 214 may be stored in a key field of a DNSKEY record and/or in an associated RRSIG record presented in a zone file. HL:ML(c) 216 may be stored in a signature field of an associated RRSIG record. The DNSKEY RRset comprising the DNSKEY record representing HL:ML(a) 212 may also comprise the DNSKEY record that includes in its key field the pseudo combined DNSKEY record/RRset and associated RRSIG record. When generating the HL:ML(c) signature 216 on the DNSKEY RRset, any such DNSKEY records that include pseudo records in their key fields may be excluded from signature processing with respect to verifying HL:ML(c) 216. Such pseudo records may instead be separately validated by HL:ML(a) 212 to complete the validation of the DNSKEY RRset. (A flag, algorithm identifier, or similar indicator associated with DNSKEY record may indicate during signature processing whether the DNSKEY record is to be included in signature processing with respect to verifying HL:ML(c) 216, or excluded and separately verified.) In such embodiments, FIG. 3 retains its three-level function while being represented in a two-level structure compatible with the current DNSSEC architecture. The elements of flattened signature HL:LL(c) 116 may therefore be stored in various fields of a DNSKEY RRset at the apex and its associated RRSIG record: ML:LL(c) 226 may be stored in a key field of a DNSKEY record together with HL:LL(a) 112 and HL:LL(b) 114 (possibly in pseudo combined form); while HL:ML(a) 212, HL:ML(b) 214 and HL:ML(c) 216 may be stored in a key field of other DNSKEY records and/or in an associated RRSIG record. HL:LL link 310 may accordingly be flattened into a single level DNSKEY RRset/RRSIG combination at the apex level, and processed and validated as though it had not been flattened.

Figure 5:
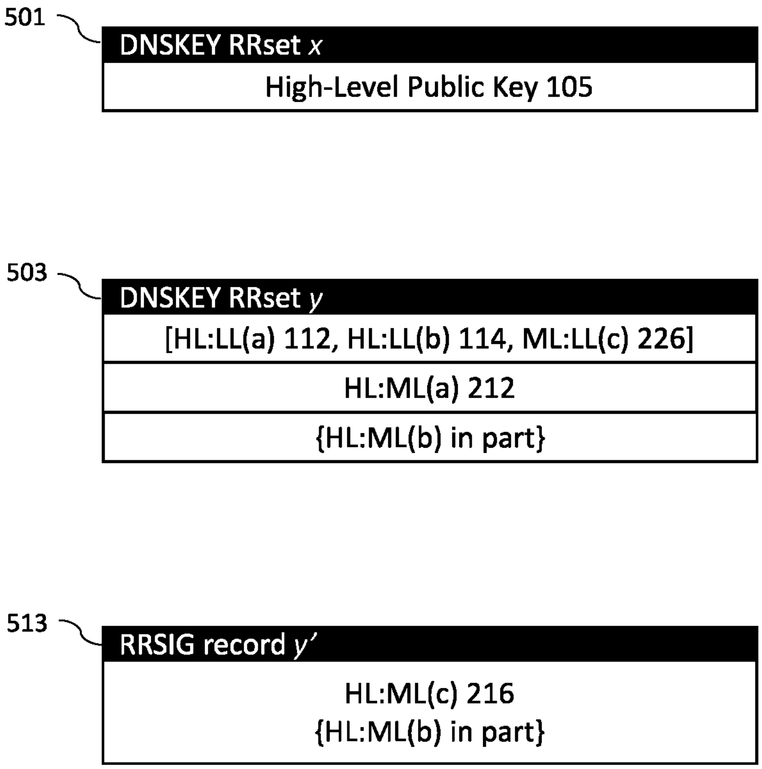
FIG. 5 is a block diagram illustrating a second example physical placement of component for flattened signatures, according to various embodiments.

FIG. 5 illustrates a physical placement of components for aforementioned scenario. The HL public key 105 may be stored in a key field of a DNSKEY record in DNSKEY RRset x 501. In particular embodiments, DNSKEY RRset x 501 may have additional DNSKEY records. DNSKEY RRset y 503 may comprise two or more DNSKEY records. A first DNSKEY record within DNSKEY RRset y 503 may include a "pseudo" combination DNSKEY record comprising HL:LL(a) 112, HL:LL(b) 114 and an associated RRSIG record comprising ML:LL(c) 226. A second DNSKEY record within DNSKEY RRset y 503 may comprise HL:ML (a) 212. In some embodiments, HL:ML(b) 214 may comprise a third DNSKEY record within DNSKEY RRset y 503. In some embodiments, HL:ML(b) 214 may be stored in part or in full in an RRSIG record y' 513 that is associated with DNSKEY RRset y 503. RRSIG record y' 513 corresponding to DNSKEY RRset y may comprise HL:ML(c) 216. When generating the signature HL:ML(c) 216 on DNSKEY RRset y 503, the first DNSKEY record comprising the "pseudo" combination may be excluded from signature processing with respect to verifying HL:ML(c) 216.

A relying party may validate the signature HL:ML(c) 216 on the ML public key 212 using the HL public key 105. The relying party may determine that additional validation on the record in DNSKEY RRset y 503 comprising the "pseudo" combination is required based on an additional indication, e.g., a flag, algorithm identifier, or similar indicator associated with the DNSKEY record. The relying party may validate the signature ML:LL(c) 226 on the LL public key 112 using the ML public key 212. Once ML:LL(c) is validated, the relying party should be able to use LL public key 112 to validate any signature associated with LL public key 112.

As an example, if the keys are associated with the zone example.TLD, then the various elements may be represented in DNSKEY and RRSIG records at the apex of the zone such as the following:

example.TLD. <TTL>IN DNSKEY <flags>3<algorithm>[HL:LL(a) HL:LL(b) ML:LL(c)]; pseudo combination of DNSKEY and RRSIG for HL:LL—not input to HL:ML processing example.TLD. <TTL>IN DNSKEY <flags>3<algorithm>[HL:ML(a)]

example.TLD. <TTL>IN RRSIG DNSKEY <algorithm>2 [HL:ML(b) HL:ML(c)]; RRSIG for HL:ML link Here, the first two records comprise a DNSKEY RRset representing a low-level public key HL:LL(a) (plus additional information HL:LL(b) and a signature ML:LL(c)) and a mid-level public key HL:ML(a). The third record comprises an RRSIG record on the DNSKEY RRset, and includes a representation of HL:ML(b) and HL:ML(c). In some embodiments, HL:ML(b) may be stored in a key field of a DNSKEY record as a third record in the DNSKEY RRset. The elements of the flattened signature HL:LL(c) are represented across multiple records. As mentioned above, <flags> or <algorithm> may indicate that whether a DNSKEY record is to be input to HL:ML signature processing, or separately validated.

In other embodiments, the elements HL:LL(a) 112, HL:LL(b) 114 and ML:LL(c) 226 may be represented as a string that is not a pseudo combined DNSKEY record/RRset and associated RRSIG record, and stored in a key field in a zone file. In embodiments, if the value of the key field includes the LL public key HL:LL(a) 112 as well as other information, regardless of representation, for consistency with current DNSSEC, when the value of the key field is used in subsequent processing, e.g., to validate a signature LL:DATA(c) 126, the validation process for LL:DATA(c) 126 may interpret the string comprising HL:LL(a) 112, HL:LL(b) 114 and ML:LL(c) 226 as performing the operations associated with HL:LL(a) 112. In embodiments, the validation of the string comprising HL:LL(a) 112, HL:LL(b) 114 and ML:LL(c) 226 with the mid-level public key HL:ML(a) 212 may be deferred until the public key HL:LL(a) 112 is used to validate a signature.

If an LL operator does not implement synthesized ZSKs, and therefore does not need flattened signatures, then the LL operator can simply publish the DNSKEY RRset produced during the ceremony. Therefore, the decision to support synthesized ZSKs is up to the LL operator, and does not affect the ceremony. The caveat mentioned above regarding synthesized KSKs still applies; if the LL operator doesn't implement synthesized ZSKs and flattened signatures, then the LL operator will need to obtain a DNSKEY RRset that includes the KSK from the ceremony.

An LL operator also has the option of publishing, e.g., responding to queries relative to two different zones, one with synthesized ZSKs and flattened signatures, and one without. Such an LL operator can thereby support both resolver operators that do implement these approaches, and resolver operators that do not implement these approaches. The resolver operator may indicate which approaches it supports via DNSSEC algorithm negotiation. The option of publishing two (or more) zones, and related algorithm negotiation, may also apply to other approaches described in this document. In one of the arrangements proposed, the mid-level signature on a synthesized ZSK is performed with a conventional ZSK. An exemplary advantage of the arrangement in this Section VIII is that only the signature algorithm in the key signing ceremony may need to be changed, i.e., to a basic post-quantum algorithm; the ceremony would not otherwise be affected by the synthesized ZSKs or flattened signatures. Rather, these techniques could then be gradually deployed by LL operators and resolvers, with backward compatibility (to the basic post-quantum algorithm) for those who haven't deployed the techniques.

According to an embodiment, the signature on the DNSKEY RRset produced during the ceremony and the signature on the DNSKEY RRset presented in the zone file (which would have a flattened signature) would both be validatable by the same KSK public key. The algorithm and key identifier for both signatures may therefore be the same, even though the signature validation operations are different. The signature representation may include a flag to distinguish the two types of processing. This is an extension of the constraint mentioned in connection with the synthesized ZSK approach, where the algorithm identifier for the ZSK signature is expected to match the algorithm identifier for at least one KSK signature, even though the signature operation in the synthesized ZSK approach is different than at the KSK level. Various implementations may need to specify different flags or other representations for the various uses of the identifier. In addition, from a cryptographic perspective, the different uses should have appropriate separation of inputs to internal operations to ensure that the security properties for one use are not affected by the other uses.

IX. Out-of-Band Signatures and Caching Optimizations

In various embodiments, the concepts described here can be combined with the out-of-band signatures and caching optimizations disclosed in U.S. Provisional Patent Application No. 63/194,835, filed on May 28, 2021, and entitled "Methods and Systems for Data Retrieval," the contents of which are incorporated herein by reference. For example, the various signatures, or portions of the signatures, could be represented in DNS as pointers to external data sources from which the actual signature or portion may be obtained. The signatures or portions may also be identified by a verifiable instance identifier (VIID) as disclosed in U.S. Provisional Patent Application No. 63/194,835. As an example, the HL:ML(c) portion 216 of the HL:LL(c) signature 116 in FIG. 3 may be identified by a VIID following the granular approach disclosed in U.S. Provisional Patent Application No. 63/194,835. Representing the HL:ML(c) portion 216 with a VIID, rather than representing only at the granularity of the full HL:LL(c) 116, may be advantageous because the HL:ML(c) portion 216 may remain constant for a longer period of time than the full HL:LL(c) 116, inasmuch as it depends only on the HL and ML public keys, which may not change as often as the LL public key. In addition, if the HL:ML(c) portion 216 is represented as a VIID (or with a pointer to an external data source), the overall size of the full HL:LL(c) 116, which includes the changing and possibly longer ML:LL(c) 226, may be reduced to a size more convenient for DNS response handling.

X. Relationship with Hash Tree Diagrams

Figure 6:
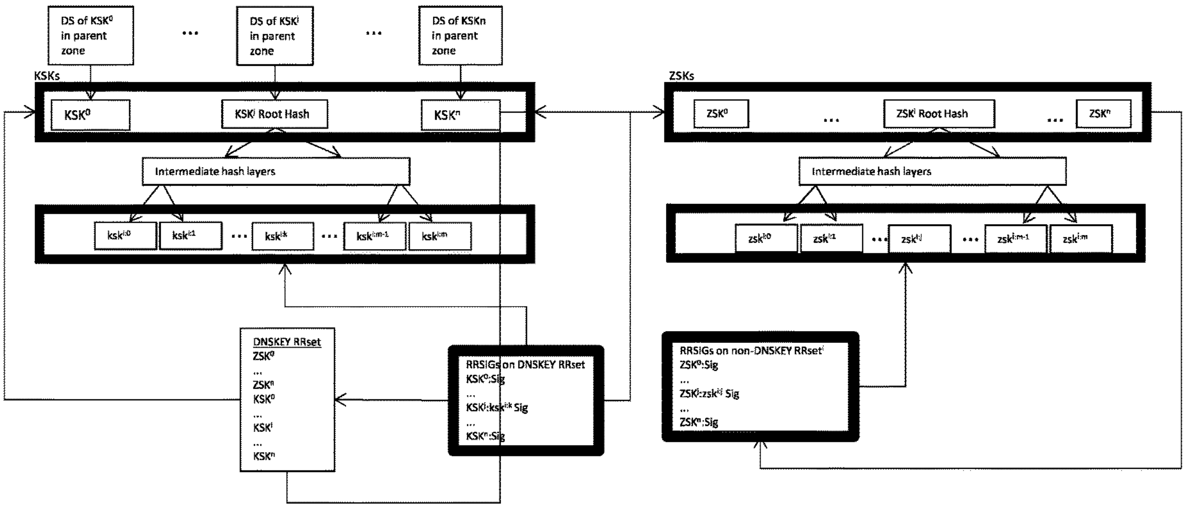
FIG. 6 is a block diagram illustrating an example of Domain Name System Security Extensions (DNSSEC) data with multiple key-signing key (KSK) and zone-signing key (ZSK) algorithm types, including hash-based algorithms for KSKs and ZSKs, according to various embodiments.
Figure 7:
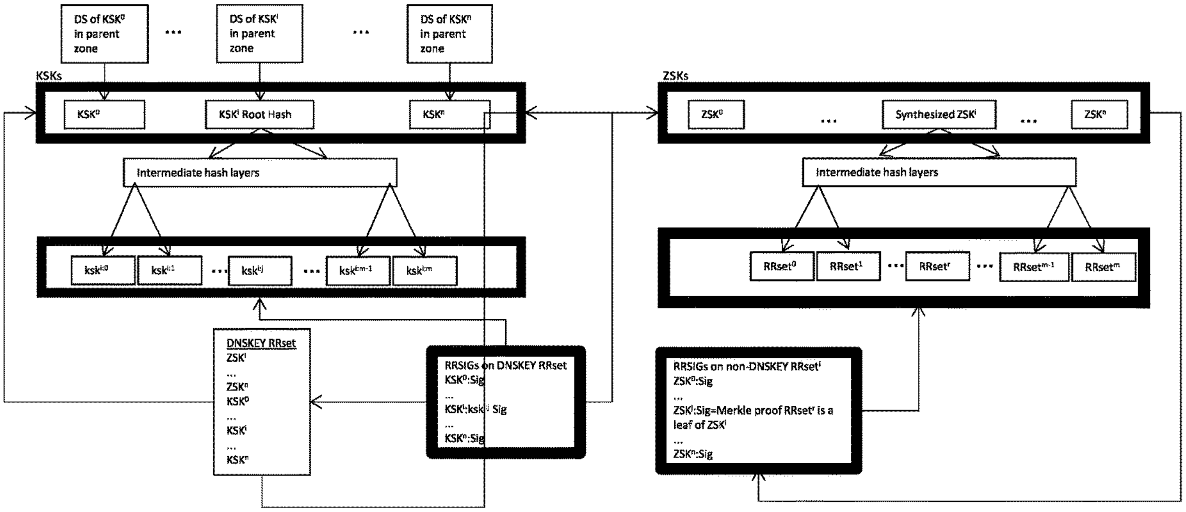
FIG. 7 is a block diagram illustrating an example of DNSSEC data with multiple KSK and ZSK algorithm types, including hash-based algorithms for KSKs and synthesized ZSKs, according to various embodiments.
Figure 8:
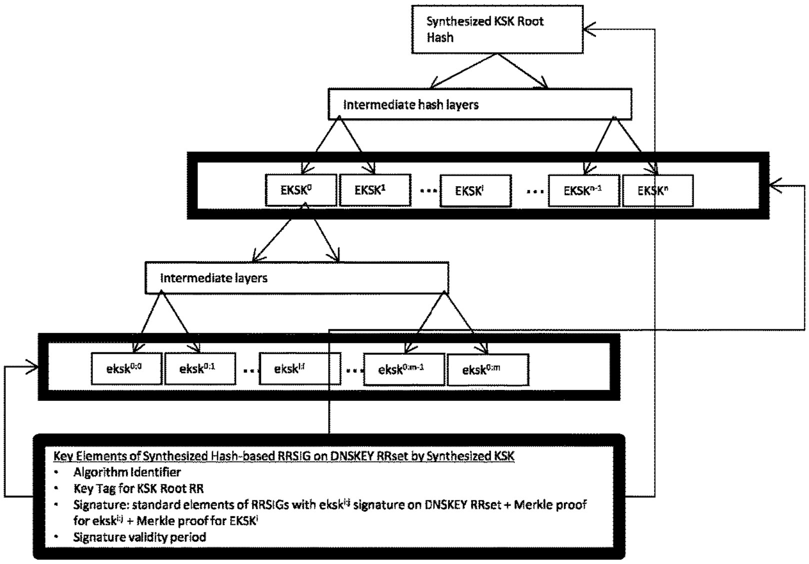
FIG. 8 is a block diagram illustrating an example of DNSSEC data for a synthesized KSK for use with a hash-based second level in a collapsed (or flattened) signature on a DNSKEY resource record set, according to various embodiments.

FIGS. 1-5 present the multiple levels of signatures without reference to specific underlying signature algorithm features, such as hash trees. FIGS. 6-8 show examples of embodiments of the underlying signature algorithm features. In the embodiments shown in FIGS. 6-8:

- The HL public keys 105 of FIGS. 1-5 correspond to the KSK root hash values of FIGS. 6-8;
- The HL private keys (not shown in FIGS. 1-5) correspond to the ksk leaves of FIGS. 6-7 (in the case of a stateful hash-based signature algorithm) or are replaced by the EKSK (extended KSK) root hash values (in the case of a synthesized KSK public key derived from ML public keys) of FIG. 8;
- The ML public keys 212 of FIGS. 1-5 correspond to the EKSK root hash values of FIG. 8, when present;
- The ML private keys (not shown in FIGS. 1-5) correspond to the eksk leaves of FIG. 8, when present;
- The LL public keys 112 of FIGS. 1-5 correspond to the ZSK root hash values of FIGS. 6-8; and
- The LL private keys (not shown in FIGS. 1-5) correspond to the zsk leaves (in the case of a stateful hash-based signature algorithm) or to the data values (in the case of a synthesized ZSK public key) of FIGS. 6-7.

For notational reference in the examples of embodiments shown FIGS. 6-8, for both KSKs and ZSKs, the semantics of superscripts on the top level keys use "i" to identify an instance of a public key within the range of 0 to "n", where "n" denotes the highest index for the set of keys. In normal operation, for example, a single instance of a key of a particular algorithm type is in use except during key roll-overs when a preceding key may overlap in time with the next current key.

For RRSIGs, the "i" in superscripts identifies the signing top level KSK or ZSK instance.

Leaf nodes for the Merkle tree for hash-based keys are comprised of public keys that have corresponding signing private keys. The leaves may be referred to as signing keys with respect to FIGS. 6-8, with the understanding that signatures are derived from the signing private keys and signatures include: a signature by a signing private key, the public key corresponding to the signing private key, and a Merkle proof that the public key is an element of the Merkle tree whose root is the "public" key for the overall hash-based key.

For hash-based algorithm KSKs and ZSKs, a two element superscript is used for leaves at the bottom of the tree in the form of "i:j" where "i" identifies the top level KSK or ZSK and "j" identifies the leaf within the Merkle tree for a signing key instance. The value of "j" is in the range of 0 to "m" and "m" denotes the highest index for the set of leaves in the Merkle tree.

For synthesized hash-based ZSKs, the leaves are RRsets with leaves identified by superscript "r" in the range of 0 to "m" potentially covering all of the RRsets in the zone except the DNSKEY RRset that includes the ZSK.

Finally, for synthesized hash-based KSKs, the superscript "i" on the middle level $EKSK^i$ leaves of the synthesized root KSK indicates the $EKSK^i$ instance within a set of 0 to "n" EKSKs. The bottom level leaves $eksk^{i:j}$ of the tree are the signing private keys for EKSKs in the middle level and are identified with the superscript "i:j" where "i" identifies the $EKSK^i$ that is the root public key for the instance and "j" indicates the instance within the set of 0 to "m" signing key leaves.

FIG. 6 is a block diagram showing an example of DNSSEC data with multiple KSK and ZSK algorithm types, including hash-based algorithms for KSKs and ZSKs, consistent with embodiments of the present disclosure. The example of FIG. 6 shows a possible DNS use case.

In the example of FIG. 6, $KSK^i$ uses a stateful hash-based algorithm where the root of the Merkle tree is the public key for $KSK^i$. In this implementation, $KSK^i$ signatures are comprised of: standard RRSIG elements; a hash-based digital signature on the DNSKEY RRset by a $ksk^{i:j}$ that is a leaf node of the Merkle tree for $KSK^i$; and a Merkle proof for $ksk^{i:j}$.

$ZSK^i$ uses a stateful hash-based algorithm where the root of the Merkle tree is the public key for the $ZSK^i$. $ZSK^i$ signatures are comprised of: standard RRSIG elements; a hash-based digital signature on an RRset by a $zsk^{i:j}$ that is a leaf node of the Merkle tree for $ZSK^i$; and a Merkle proof for $zsk^{i:j}$.

According to an embodiment, RRSIGs have a signature expiration time as a record element. This value is set when an RRSIG is generated and must fall within the validity period for a signing leaf node. There may be an overall validity period assigned to the public key that is the Merkle tree root of a hash-based key. Validity periods for signing leaf nodes must fall within any validity period assigned to the public key that is the root of the Merkle tree.

If hash-based private keys are delegated by a zone authority to another operator and/or included in separate cryptographic modules, it may be helpful to enforce a validity period for the signing leaf nodes, to limit the time impact of compromise of the private key. A secure way of setting the validity period for signing leaf nodes, for example, is to use a validity period along with the leaf node public key as input for the parent hash in the Merkle tree. Validity periods for signing leaf nodes might also be set by using a validity period as an input to hashes within the Merkle tree hierarchy to which a leaf node public key belongs. A drawback to these approaches is that validity periods are set at time of tree generation. To provide flexibility in validity periods for one-time signature (OTS) key pairs, sub-trees, and consequently OTS key pairs for their leaves, may be dynamically created and signed by OTS private keys for previously generated higher level parent trees. Validity periods for such dynamically created sub-trees and OTS key pairs for their leaves may be determined at time of sub-tree creation and should be constrained to be a subset of any validity period applicable to an OTS key pair from a parent tree that signs the sub-tree. According to an embodiment, validity periods must be enforced during signature validation to achieve the desired intent of validity periods wherein signatures incorporate the validity period applicable to the signing OTS key pair due to the inclusion of validity periods in the hashes that comprise the signature.

Another mechanism for assigning signing keys to a validity period, for example, is to order leaves by an index and have the index included as input to the parent hash (and/or to rely on the position of the leaf in the Merkle tree as a representation of the index). The indexes are assigned to a validity period that is known based on the index value identifying a fraction of the overall validity period of the parent key. The fraction may be the same for all indexes or may overlap or vary as long as the arrangement is known to or validatable by a relying party.

FIG. 7 is a block diagram showing an example of DNSSEC data with multiple KSK and ZSK algorithm types, including hash-based algorithms for KSKs and synthesized ZSKs, consistent with embodiments of the present disclosure. The example of FIG. 7 shows another possible DNS use case.

In the example of FIG. 7, $KSK^i$ uses a stateful hash-based algorithm where the root of the Merkle tree is the public key for $KSK^i$. $KSK^i$ signatures are comprised of: standard RRSIG elements; a hash-based digital signature on the DNSKEY RRset by a $ksk^{i:j}$ that is a leaf node of the Merkle tree for $KSK^i$; and a Merkle proof for $ksk^{i:j}$.

$ZSK^i$ is a synthesized ZSK as described with regard to FIGS. 1-5 above. The ZSK is generated when a batch of RRsets are available for use as the leaves of the Merkle tree, and the tree is constructed from the RRsets.

According to an embodiment, RRSIGs have a signature expiration time as a record element. This value is set when an RRSIG is generated and may fall within the validity period for a signing leaf node. There may be overall validity period assigned to the public key that is the Merkle tree root of a hash-based key. Validity periods for signing leaf nodes must fall within any validity period assigned to the public key that is the root of the Merkle tree.

FIG. 8 is a block diagram showing an example of a synthesized KSK with a hash-based second level in a collapsed signature on a DNSKEY RRset resource record, consistent with embodiments of the present disclosure. The example of FIG. 8 shows yet another possible DNS use case.

In the example of FIG. 8, the synthesized KSK Root Hash is meant to be generated and then used over a substantial or predetermined duration of time. The predetermined duration of time, for example, may be based on a DNSSEC practice statement or policy, and/or may be extended when needed to allow sufficient time to roll over a key. Therefore, the EKSK's that form its leaves should all be known at the time it is created. If these KSKs are Merkle tree roots for hash-based signature algorithms, then the Merkle tree's roots for each $EKSK^i$ need to be determined in order to generate the KSK Root Hash.

According to an embodiment, the leaf EKSKs ($EKSK^0$ . . . $EKSK^n$) of the Merkle tree form the second-level public keys of a three-level hierarchy of keys. EKSKs may be given out in batches to zone operators as part of signing ceremonies together with information sufficient for the zone operator to obtain the corresponding private keys. Alternatively, EKSK public keys may be submitted by zone operators to zone administrators for signing during the signing ceremony. When the Merkle tree is formed for the top level KSK, a validity period may be applied to the EKSKs by having the validity period included as input when forming the parent hash for each EKSK. Validity periods for a batch of EKSKs should have some overlap into the period for the next batch of KSKs. According to an embodiment, an implementation might apply validity periods to individual $eksk^{i:j}$ leaves of a $EKSK^i$ when $EKSK^i$ is generated. Per methods described above, a validity period for a $EKSK^i$ and/or $eksk^{i:j}$ could be based on the index of $EKSK^i$ or $eksk^{i:j}$ identifying a fractional component of an overall validity period assigned to the root of the Merkle tree (either the KSK root hash or an $EKSK^i$ root hash) to which it belongs.

According to an embodiment, the leaf eksks ($eksk^{i:j}$) are used for signing DNSKEY RRsets. They are subject to the validity period of their parent second-level public key ($EKSK^i$) or per the previous paragraph, may have their own validity period.

According to an embodiment, RRSIGs on the DNSKEY RRset have a signature expiration time specified in each RRSIG. The signer sets this value at the time they produce the RRSIG based on the expiration time of the signing $EKSK^i$ or $eksk^{i:j}$ that created the signature. The signature expiration time must fall within the validity period for the signing key.

According to an embodiment, to maintain DNSSEC's two-level key hierarchy: the second level EKSKs are not visible except as part of proofs in KSK signatures, which is the mechanism referred to as a flattened signature.

According to an embodiment, a zone operator is given a "base" private key from which the one-time eksk private keys may be derived. The zone operator can then use these keys to form additional signatures on the DNSKEY RRset, in particular as synthesized ZSKs are added. This is comparable, for example, to the "delegated one-time private key" approach as described in Section V.

In various implementations of the embodiment shown in FIGS. 6-8, the hash-based KSKs are generated during key generation ceremonies conducted by an authority for the zone. Validity periods may be set at the time of key generation for signing keys per methods described previously herein. In some such implementations, the validity period of signing keys must fall within and/or span the time period covered by the signing ceremony in which they are allocated.

In various implementations, the delegation signer (DS) RRsets for hash-based KSK public keys are generated during the key generation ceremony for the KSKs, and the authority for a zone keeps control of and maintains the secrecy of the corresponding KSK private keys.

In various implementations, the DNSKEY RRsets for hash-based KSKs are provided to the zone operator during signing ceremonies. The hash-based keys for ZSKs may be generated by the zone operator and provided to the zone authority for signing by hash-based KSKs in signing ceremonies conducted by an authority for the zone (except in the case where synthesized hash-based ZSKs occur dynamically). The hash-based public keys for ZSKs and KSKs are included in DNSKEY RRsets that are signed during signing ceremonies conducted by an authority for the zone (except in the case where synthesized hash-based ZSKs occur dynamically).

According to an embodiment, for synthesized hash-based ZSKs that occur dynamically as a result of changes in a zone, DNSKEY RRsets containing them need to be dynamically signed outside of signing ceremonies. To support this, batches of signing keys may be given to a zone operator during a signing ceremony. The public keys corresponding to the private signing keys and the Merkle proofs for those public keys may also be given to the zone operator so that they can be provided in DNSKEY RRSIGs used to verify DNSKEY RRsets.

In various embodiments, the zone authority uses the signing keys for the leaves of a KSK or EKSK to sign the DNSKEY RRsets and only uses signing keys that have a validity period falling within the validity period applicable to the signing ceremony, and the KSK signed DNSKEY RRsets are given to the zone operator during signing ceremonies. According to an embodiment, it is the responsibility of the zone operator to only use ZSK signing keys that have a valid current validity period when signing RRsets for a zone.

In the embodiments described in FIGS. 6-8, validation of a hash-based signature using the Merkle proof in a signature proves that the signature was generated by a signing private key for a leaf node of the Merkle tree having a public key that is a KSK or ZSK as found in a current DNSKEY RRset for the zone. Verification also shows that the signature falls within the validity period for the signing key.

In various embodiments, the hash-based signature scheme may involve a hierarchical or multi-tree as previously described.

In various embodiments, (for example, as described in U.S. Pat. No. 11,025,407, issued on 1 Jun. 2021), inclusion of a validity period along with the public key when hashing to create a parent node in the Merkle tree can be used to support enforcement of the validity period.

In various embodiments, (for example, as described in U.S. Pat. No. 11,025,407, issued on 1 Jun. 2021), the index of a signing key can be used to determine if a key and signatures created by it fall within some validity period by using the index to determine a fractional period of the validity period for the root of the Merkle tree to which the signing key belongs and using this fraction to determine the validity period of the signing key or signature.

XI. Incorporation By Reference

U.S. Provisional Patent Application No. 63/194,835 filed May 28, 2021 and U.S. patent application Ser. No. 17/827,576 filed May 27, 2022 are incorporated herein by reference.

XII. Example Apparatus

Figure 9:
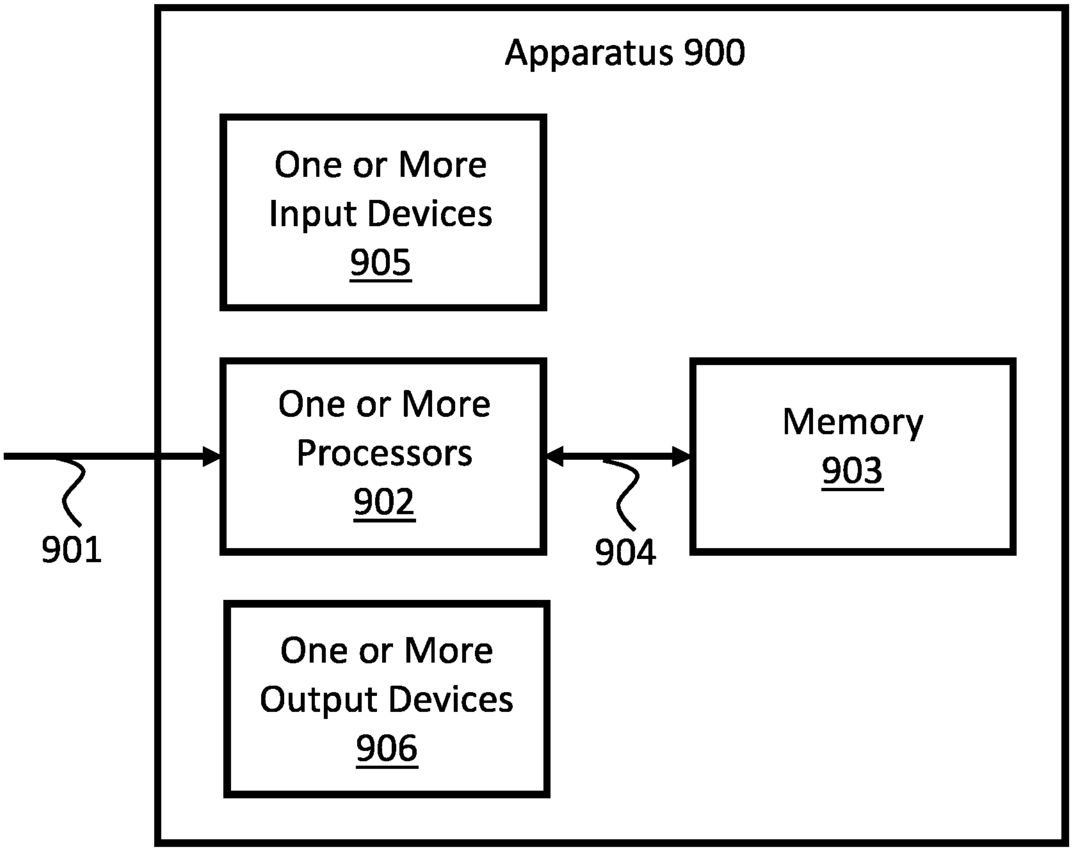
FIG. 9 illustrates an example of an apparatus that may be used to implement one or more features disclosed herein, in accordance with certain embodiments.

FIG. 9 depicts an example of an apparatus 900 that that may be used to implement one or more features disclosed herein, in accordance with certain embodiments. In this example, the apparatus 900 includes one or more processors 902, a memory 903, one or more user input devices 905, and one or more output devices 905.

The one or more processors 902 may include a general-purpose processor, an integrated circuit, a server, other programmable logic device, or any combination thereof. The processor may be a conventional processor, microprocessor, controller, microcontroller, or state machine. The one or more processors may be one, two, or more processors of the same or different types. Furthermore, the one or more processors may be a computer, computing device and user device, and the like.

The memory 903 is accessible by the one or more processors 902 via the link 904 so that the one or more processors 902 can read information from and write information to the memory 903. In one example, the one or more user input collected by one or more user input devices 905 is processed by the one or more processors 902 and stored in the memory 903. The one or more processors 902 may send output via one or more outputs 906. Memory may be integral with or separate from the processors. Examples of the memory 903 include RAM, flash, ROM, EPROM, EEPROM, registers, disk storage, or any other form of storage medium. The memory 903 may store instructions that when executed by the one or more processors 902 implement one or more embodiments of the invention. The memory 903 may store instructions that when executed by the one or more processors 902 cause the one or more processors 902 to implement one or more embodiments of the invention. Memory 903 may be a non-transitory computer-readable medium that stores instructions, which when executed by a computer, cause the computer to perform one or more of the exemplary methods discussed herein.

According to certain embodiments, a computer-implemented method may comprise one or more of the methods described herein. Further, an apparatus may comprise one or more processors and one or more non-transitory computer-readable media storing instructions that, when executed by the one or more processors, cause the apparatus to perform one or more of the methods described herein. Further, a system may comprise one or more processors and one or more non-transitory computer-readable media storing instructions that, when executed by the one or more processors, cause the one or more processors to perform one or more of the methods described herein. Further, one or more non-transitory computer-readable media may store instructions that, when executed by one or more processors, cause the performance of one or more of the methods described herein.

Certain embodiments can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

XIII. Illustrative Embodiments

The invention includes other items, such as the following.

Item 1. A method of validating an electronic signature, the method comprising: obtaining: a mid-level public key, information associated with the mid-level public key, a first electronic signature on the mid-level public key and the information associated with the mid-level public key, and a second electronic signature on a low-level public key and information associated with the low-level public key; validating, using a high-level public key, the first electronic signature; and validating, using the mid-level public key, the second electronic signature.

Item 2. The method of Item 1, wherein an electronic signature comprises the mid-level public key, the first electronic signature, and the second electronic signature, wherein the obtaining comprises: obtaining the electronic signature.

Item 3. The method of Item 2, wherein the electronic signature is a flattened electronic signature.

Item 4. The method of Item 2, wherein the electronic signature is stored in a DNS record.

Item 5. The method of Item 4, wherein obtaining the electronic signature comprises: obtaining the electronic signature from a signature field of the DNS record.

Item 6. The method of Item 1, wherein the low-level public key and the second electronic signature are stored in a DNS record.

Item 7. The method of Item 8, wherein the obtaining comprises: obtaining the low-level public key and the second electronic signature from a key field of the DNS record.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of creating an electronic signature, the method comprising:

obtaining a first electronic signature on a mid-level public key and information associated with the mid-level public key, wherein the first electronic signature is validatable by a high-level public key;

obtaining a low-level public key and information associated with the low-level public key;

generating a second electronic signature on the low-level public key and the information associated with the low-level public key, wherein the second electronic signature is validatable by the mid-level public key; and constructing a third electronic signature on the low-level public key, the third electronic signature comprising the mid-level public key, the information associated with the mid-level public key, the first electronic signature and the second electronic signature, wherein the third electronic signature is validatable by the high-level public key.

2. The method of claim 1, wherein the third electronic signature is stored in a DNS record.

3. The method of claim 2, further comprising:

storing the third electronic signature in a signature field of the DNS record.

4. The method of claim 1, wherein the low-level public key and the second electronic signature are stored in a DNS record.

5. The method of claim 4, further comprising:

storing the low-level public key and the second electronic signature in a key field of the DNS record.

6. The method of claim 4, wherein the DNS record comprises information indicating that the DNS record is not signed by the first electronic signature and that the DNS record requires separate verification by the mid-level public key.

7. The method of claim 1, wherein the third electronic signature is a flattened electronic signature.

8. One or more non-transitory computer-readable media storing instructions that, when executed by one or more processors, cause the one or more processors to:

obtain a first electronic signature on a mid-level public key and information associated with the mid-level public key, wherein the first electronic signature is validatable by a high-level public key;

obtain a low-level public key and information associated with the low-level public key;

generate a second electronic signature on the low-level public key and the information associated with the low-level public key, wherein the second electronic signature is validatable by the mid-level public key; and construct a third electronic signature on the low-level public key, the third electronic signature comprising the mid-level public key, the information associated with the mid-level public key, the first electronic signature and the second electronic signature, wherein the third electronic signature is validatable by the high-level public key.

9. The media of claim 8, wherein the third electronic signature is stored in a DNS record.

10. The media of claim 9, further comprising:

storing the third electronic signature in a signature field of the DNS record.

11. The media of claim 8, wherein the low-level public key and the second electronic signature are stored in a DNS record.

12. The media of claim 11, further comprising:

storing the low-level public key and the second electronic signature in a key field of the DNS record.

13. The media of claim 11, wherein the DNS record comprises information indicating that the DNS record is not signed by the first electronic signature and the DNS record requires separate verification by the mid-level public key.

14. The media of claim 8, wherein the third electronic signature is a flattened electronic signature.

15. A system comprising:

one or more processors; and one or more non-transitory computer-readable media coupled to one or more of the processors and comprising instructions that, when executed by the one or more processors, cause the system to:

obtain a first electronic signature on a mid-level public key and information associated with the mid-level public key, wherein the first electronic signature is validatable by a high-level public key;

obtain a low-level public key and information associated with the low-level public key;

generate a second electronic signature on the low-level public key and the information associated with the low-level public key, wherein the second electronic signature is validatable by the mid-level public key; and construct a third electronic signature on the low-level public key, the third electronic signature comprising the mid-level public key, the information associated with the mid-level public key, the first electronic signature and the second electronic signature, wherein the third electronic signature is validatable by the high-level public key.

16. The system of claim 15, wherein the third electronic signature is stored in a DNS record.

17. The system of claim 16, further comprising:

storing the third electronic signature in a signature field of the DNS record.

18. The system of claim 15, wherein the low-level public key and the second electronic signature are stored in a DNS record.

19. The system of claim 18, further comprising:

storing the low-level public key and the second electronic signature in a key field of the DNS record.

20. The system of claim 18, wherein the DNS record comprises information indicating that the DNS record is not signed by the first electronic signature and that the DNS record requires separate verification by the mid-level public key.

21. The system of claim 15, wherein the third electronic signature is a flattened electronic signature.

* * * * *